(12) United States Patent
LaPrade

(10) Patent No.: US 9,132,707 B2
(45) Date of Patent: Sep. 15, 2015

(54) TRAILER HITCH PLATE SYSTEMS AND METHODS

(71) Applicant: John Wasem LaPrade, Friday Harbor, WA (US)

(72) Inventor: John Wasem LaPrade, Friday Harbor, WA (US)

(*) Notice: Subject to any disclaimer, the term of this patent is extended or adjusted under 35 U.S.C. 154(b) by 0 days.

(21) Appl. No.: 13/911,414

(22) Filed: Jun. 6, 2013

(65) Prior Publication Data

US 2013/0334793 A1   Dec. 19, 2013

Related U.S. Application Data

(60) Provisional application No. 61/656,449, filed on Jun. 6, 2012, provisional application No. 61/700,323, filed on Sep. 12, 2012.

(51) Int. Cl.
*B60D 1/06* (2006.01)
(52) U.S. Cl.
CPC .......................................... *B60D 1/06* (2013.01)
(58) Field of Classification Search
USPC .................................................. 280/512, 514
See application file for complete search history.

(56) References Cited

U.S. PATENT DOCUMENTS

| | | | |
|---|---|---|---|
| 4,522,421 A * | 6/1985 | Vance | 280/511 |
| 5,263,735 A | 11/1993 | Mann | |
| 5,335,930 A | 8/1994 | Tighe | |
| 5,382,109 A | 1/1995 | Nyman | |
| 5,385,363 A | 1/1995 | Morey | |
| 5,482,309 A | 1/1996 | Hollis | |
| 6,250,650 B1 | 6/2001 | Douglas | |
| 6,264,229 B1 | 7/2001 | Gill et al. | |
| 6,464,241 B1 | 10/2002 | Daniel | |
| 6,588,790 B2 | 7/2003 | Hall | |
| 6,808,195 B2 | 10/2004 | Smith | |
| 6,880,368 B1 | 4/2005 | Ulbrich et al. | |
| 6,983,950 B2 * | 1/2006 | McCoy et al. | 280/511 |
| 7,378,013 B2 | 5/2008 | Sandler | |
| 7,390,008 B1 | 6/2008 | Hall | |
| 7,926,832 B1 | 4/2011 | Hall | |
| 2003/0047908 A1 | 3/2003 | Lara | |

FOREIGN PATENT DOCUMENTS

SU   842258   6/1981

OTHER PUBLICATIONS

International Searching Authority, "PCT International Search Report", Jun. 15, 2012, 9 pages.
JGW Enterprises, LLC, Gooseneck Easy Coupler/Making Life Easier, web.archive.org/web/20101222031000/http://www.gooseneckeasycoupler.com/, Dec. 2010, 3 pages.
Trailer Enterprises Brochure, RAM Gooseneck Coupler, Part Nos. SAC2516-I, SAC-BOLT 293900, SAC-NUT 293910, p. 1.

(Continued)

*Primary Examiner* — Tony Winner
(74) *Attorney, Agent, or Firm* — Michael R. Schacht; Schacht Law Office, Inc.

(57) ABSTRACT

A hitch system for coupling a hitch post to a ball portion employs a control system configured to operate in a service mode and a master mode. The control system operates in the master mode upon entry of a master code. Entry of the master code is not required to operate the control system when the control system is in the service mode. Entry of the master code is required to operate the control system when the control system is in the master mode.

11 Claims, 21 Drawing Sheets

(56) References Cited

OTHER PUBLICATIONS

Trailer Enterprises Brochure, Fulton Gooseneck Coupler, Part No. GN 291500, p. 1.
Trailer Enterprises Brochure, T.E.M.-Co., Auto-Lock Couplers, Part Nos. SM2516NP, SM251628, LL2516ST, p. 1.
Trailer Enterprises Brochure, Bulldog Gooseneck Couplers, Part Nos. HB2516NP, HBA2516, HBQ2516ADJ, HBQ2516TW, HBA2516-25K, HBA2516-30K, p. 2.
Trailer Enterprises Brochure, B&W Trailer Hitches the Defender Gooseneck Coupler, Part No. BW4250, Aug. 2010, p. 2.
Trailer Enterprises Brochure, RAM Pacific Rim Gooseneck Couplers, Part Nos. GCPN25000, GCSQ25000, GCPN30000, p. 3.
Trailer Enterprises Brochure, Atwood, Wallace Forge Company Flat Mount Couplers, Part Nos. 75074, FMC251614, FC25, p. 3.
Trailer Enterprises Brochure, Saf Holland, Wallace Forge Company Square Mount Draw Bars and Nose Plates, Part Nos. 1250-15, R49A, 1385, R51A, TNP71675, TNP716100, BLT716575, BLT716100, p. 3.
International Searching Authority, International Search Report PCT/US 2013/044532, Sep. 26, 2013, 7 pages.
RV Security, "RV Security System," Website https://web.archive.org/web/20110220122149/http://www.rvsecurity.net/?, Feb. 20, 2011, 2 pages.

\* cited by examiner

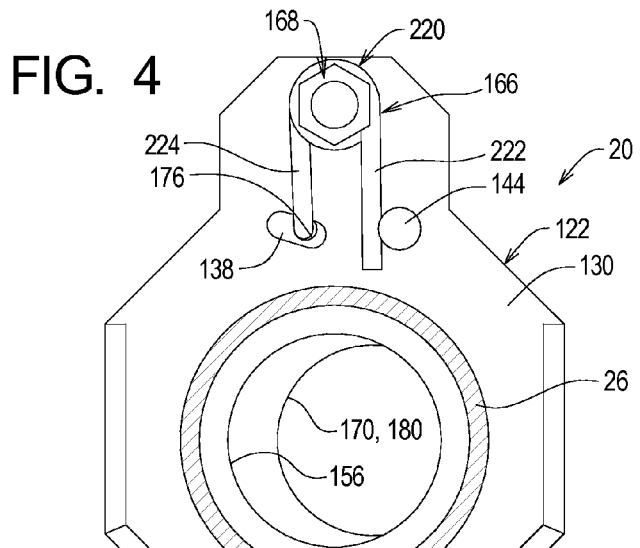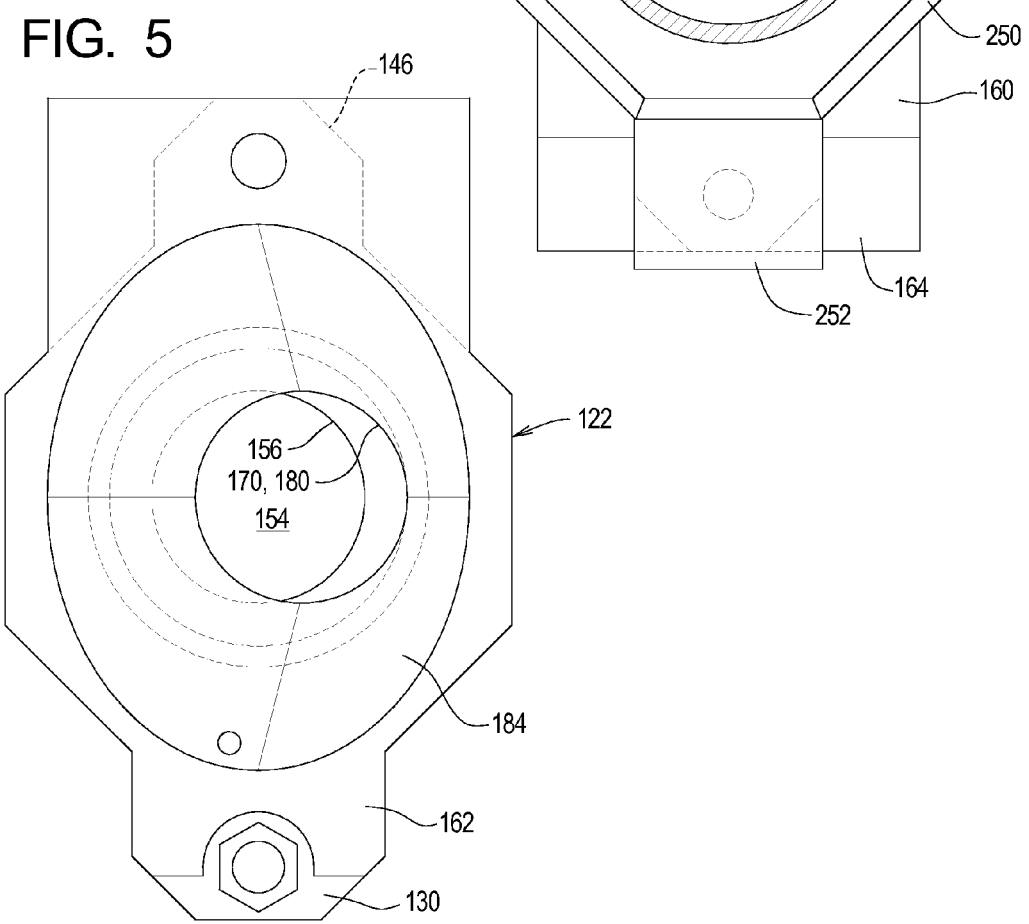

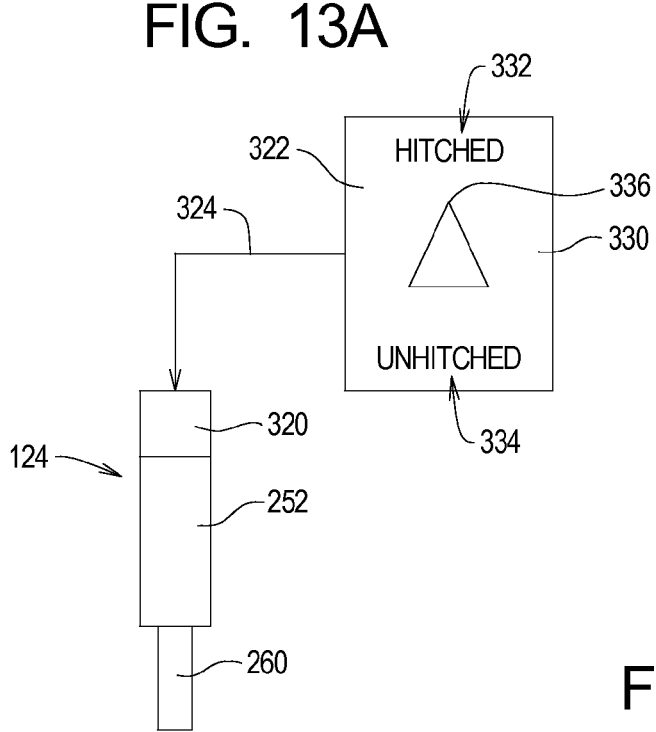
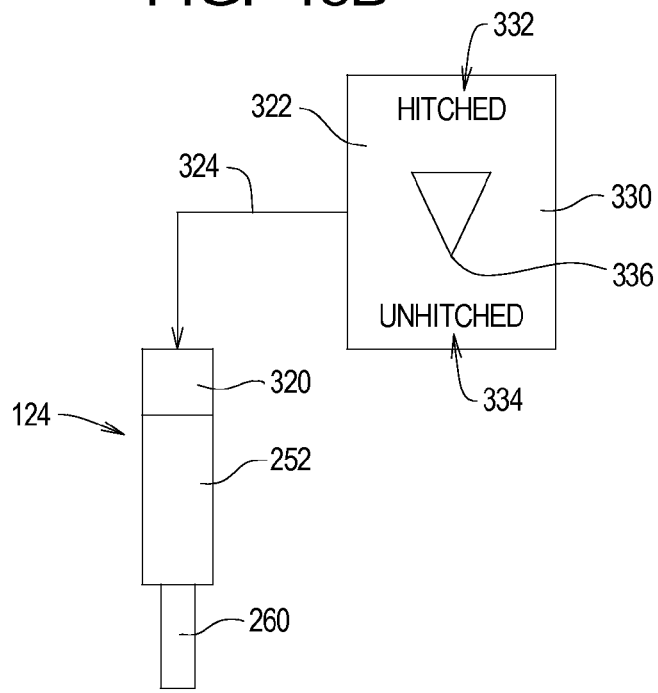

TRAILER HITCH PLATE SYSTEMS AND METHODS

RELATED APPLICATIONS

This application, U.S. patent application Ser. No. 13/911,414 filed Jun. 6, 2013 claims benefit of U.S. Provisional Patent Application Ser. Nos. 61/656,449 filed Jun. 6, 2012 and 61/700,323 filed Sep. 12, 2012.

The contents of all related application listed above are incorporated herein by reference.

TECHNICAL FIELD

The present invention relates to trailer hitch systems and, more specifically, to trailer hitch plate assemblies for trailer hitch systems for goose neck hitch systems.

BACKGROUND

A common hitch system for connecting a trailer to a vehicle such as a truck is referred to as a goose neck hitch. Goose neck systems typically employ a hitch system or coupler comprising a ball secured to the truck and a tube secured to the trailer. The tube supports a housing and lock plate that rotates relative to the housing. The ball is arranged within the housing with the lock plate in a first position, and the lock plate is rotated from first position to a second position such that a hole in the lock plate is misaligned with the housing. With the hole in the lock plate misaligned with the housing, the ball is prevented from being withdrawn from the housing, thereby securing the trailer to the truck.

Conventional goose neck hitch or coupler systems are manually operated, which requires the user to climb onto the truck bed and reach or crawl under the trailer to unlatch the lock plate and rotate the lock plate to hitch and unhitch the trailer. Manually unlatching the lock plate can be awkward for many users, and it is difficult to determine whether the trailer is securely latched to the truck. It may also be difficult for the user to align the opening with the ball when coupling the trailer to the vehicle. An example of a conventional, manually operated goose neck hitch or coupler system is sold under the trade name Bulldog Gooseneck Coupler.

The need exists for improved automated and/or manual systems and methods for hitching trailers to vehicles such as trucks.

SUMMARY

The present invention may be embodied as a hitch system for coupling a hitch post to a ball portion comprising a housing, a hitch plate, and a guide plate. The housing is secured to the hitch post and defines a housing opening and a housing chamber. The hitch plate is rotatably attached to the housing and defines a first ball opening. The hitch system operates in an unhitched configuration in which the first ball opening is aligned with the housing opening and a hitched configuration in which the first ball opening is not aligned with the housing opening. The guide plate is secured to the hitch plate. The guide plate defines a second ball opening that is aligned with the first ball opening and a guide surface that is angled towards the second ball opening. The ball portion is inserted into the housing chamber and removed from the housing chamber when the hitch system is in the unhitched configuration. The ball portion is substantially secured within the housing chamber when the hitch system is in the hitched configuration.

The present invention may also be embodied as a hitch system for coupling a hitch post to a ball portion comprising a lock plate, a hitch plate assembly, and a lock assembly. The lock plate is adapted to be rigidly connected to the hitch post and defines a main opening and a first lock opening. The hitch plate assembly is pivotably supported relative to the lock plate and defines a first ball opening and a second lock opening. The lock assembly comprises a lock housing, a lock member supported by the lock housing for movement between first and second positions, and a detent member. The hitch plate assembly may be pivoted between an uncoupled position and a coupled position relative to the lock plate. When the hitch plate assembly is in the uncoupled position, the main opening and the first ball opening are substantially aligned. When the hitch plate assembly is in the coupled position, the main opening and the first ball opening are partly misaligned and the first lock opening and the second lock opening are substantially aligned. When the hitch plate assembly is in the coupled position, the lock member is moved from a first position in which the lock member is not within the first and second lock openings to a second position in which the lock member is within the first and second lock openings to prevent the hitch plate from being pivoted out of the coupled position. When the lock member is in the second position, the detent member engages the hitch plate assembly to inhibit movement of the lock member from the second position to the first position.

The present invention may also be embodied as a hitch system for coupling a hitch post to a ball portion comprising a housing secured to the hitch post. The hitch system comprises a housing, a hitch plate, an actuator, and a control system. The housing defines a housing opening and a housing chamber. The hitch plate is rotatably attached to the housing and defines a first ball opening. The hitch system operates in an unhitched configuration in which the first ball opening is aligned with the housing opening and a hitched configuration in which the first ball opening is not aligned with the housing opening. The actuator is configured to selectively displace the hitch plate to place the hitch system in the unhitched configuration and the hitch configuration. The control system is configured to operate in a service mode and a master mode. The control system operates in the master mode upon entry of a master code. Entry of the master code is not required to operate the control system when the control system is in the service mode. Entry of the master code is required to operate the control system when the control system is in the master mode. The ball portion is inserted into the housing chamber and removed from the housing chamber when the hitch system is in the unhitched configuration. The ball portion is substantially secured within the housing chamber when the hitch system is in the hitched configuration.

The present invention may also be embodied as a method of coupling a hitch post to a ball portion comprising the following steps. A housing defining a housing opening and a housing chamber is secured to the hitch post. A hitch plate defining a first ball opening is pivotably attached to the housing such that the hitch plate allows the hitch system to operate in an unhitched configuration in which the first ball opening is aligned with the housing opening and a hitched configuration in which the first ball opening is partly aligned with the housing opening. The actuator is arranged to selectively displace the hitch plate to place the hitch system in the unhitched configuration and the hitch configuration. A control system is operable in a service mode and a master mode. The control system operates in the master mode upon entry of a master code. Entry of the master code is not required to operate the control system when the control system is in the service mode. Entry of the master code is required to operate the control system when the control system is in the master mode. The ball portion is inserted into the housing chamber and removed from the housing chamber when the hitch system is in the unhitched configuration. The ball portion is substantially secured within the housing chamber when the hitch system is in the hitched configuration.

BRIEF DESCRIPTION OF THE DRAWINGS

FIG. 4 is a section view taken along lines 4-4 in FIG. 2 showing the first example hitch system in a locked configuration;

FIG. 5 is a bottom plan view of the first example hitch system showing the first example hitch system in the locked configuration;

FIGS. 13A and 13B are schematic views of a control system for operating an actuator of the first example hitch system in hitched and unhitched configurations;

DETAILED DESCRIPTION

Figure 1:
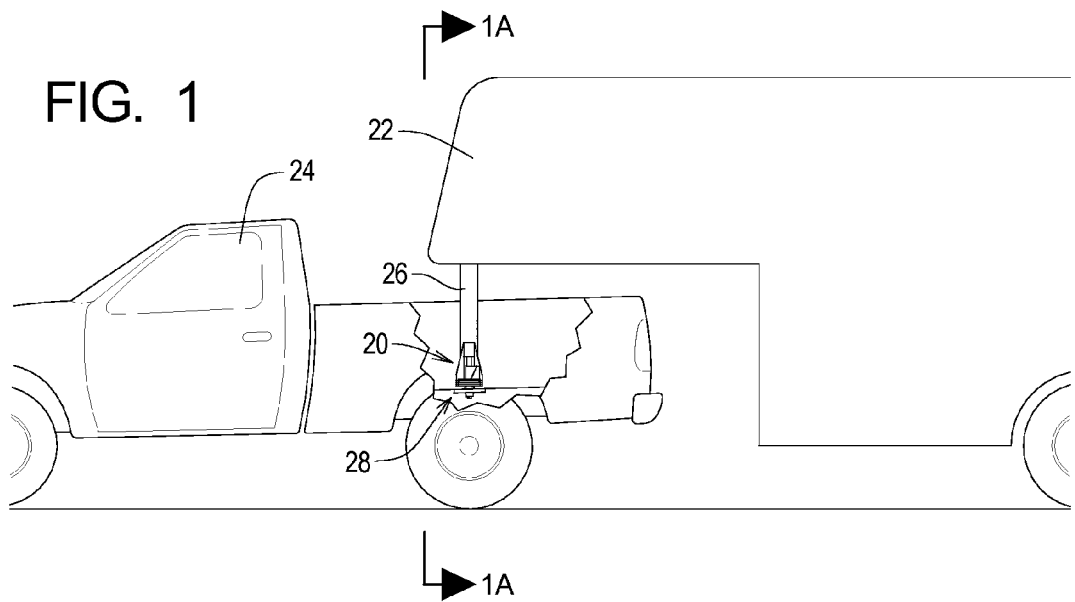
FIG. 1 is a perspective view of one possible environment illustrating the use a first example hitch system of the present invention.

Referring initially to FIG. 1 of the drawing, depicted at 20 therein is a first example hitch system adapted to connect a trailer 22 to a truck 24. In particular, the hitch system 20 is supported by a hitch post 26 connected to the trailer 22 to engage a ball assembly 28 (FIGS. 8 and 11) supported by the truck 24. The hitch post 26 and the ball assembly 28 are not per se part of the present invention, and examples of the hitch post 26 and the ball assembly 28 will be provided below simply to provide a complete understanding of the principles of the present invention.

Figure 8:
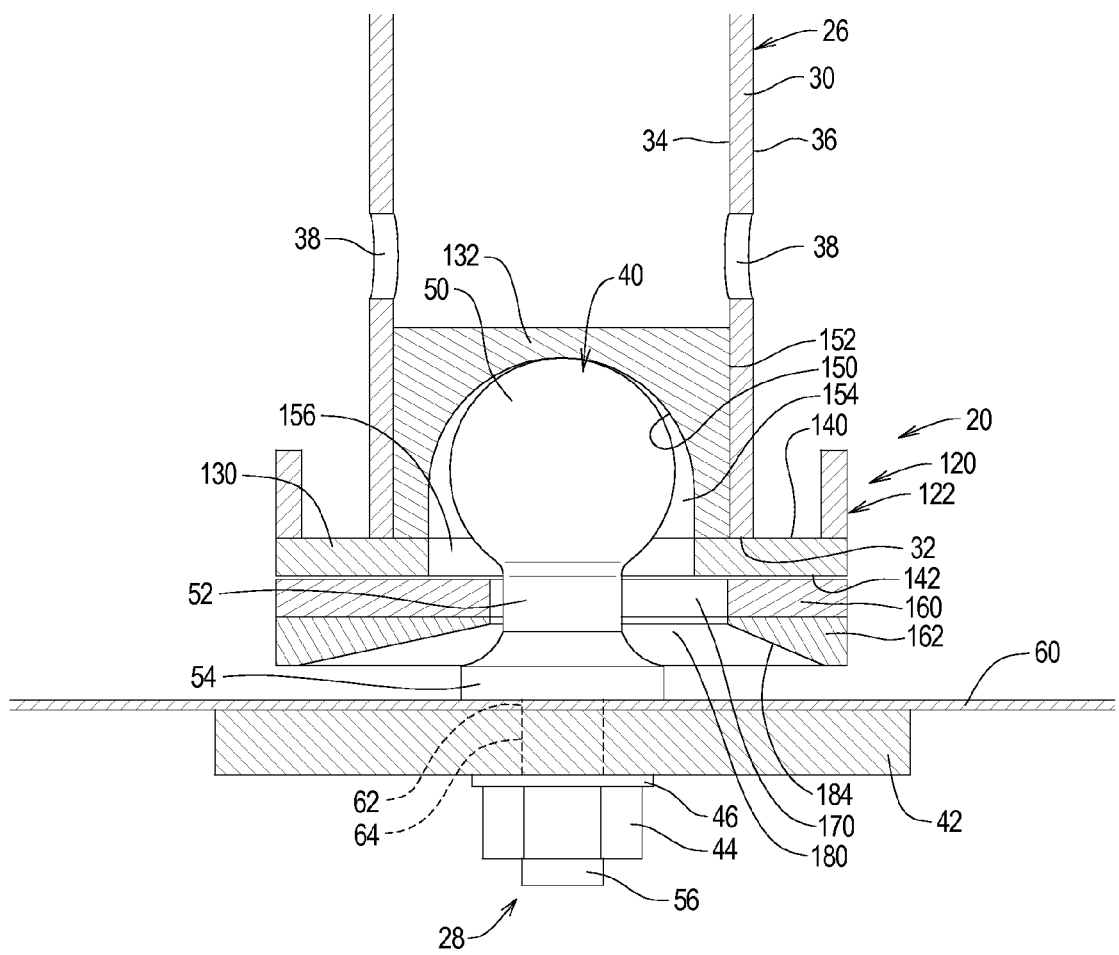
FIG. 8 is a section view taken along lines 8-8 in FIG. 3 showing the first example hitch system engaging a ball assembly in the locked configuration.

As perhaps best shown in FIG. 8, the example hitch post 26 defines a post wall 30 having a lower edge 32, an inner surface 34, and an outer surface 36. As may be conventional, post openings 38 are formed in the post wall 30. Other configurations of hitch posts other than the example hitch post 26 may be used in conjunction with a hitch system of the present invention.

FIG. 8 also shows that the example ball assembly 28 comprises a ball member 40, a ball plate 42, a ball nut 44, and a ball washer 46. The example ball member 40 comprises a ball portion 50, a neck portion 52, a base portion 54, and an anchor portion 56. FIG. 8 also shows that the truck 24 defines a bed wall 60 defining a bed wall opening 62 and that the ball plate 42 defines a ball plate opening 64. In use, the anchor portion 56 of the ball member 40 is passed through the bed wall opening 62 and the ball plate opening 64 such that the anchor portion 56 engages the bed wall 60. The ball nut 44 is engaged with the anchor portion 56 of the ball member 40 such that the ball nut 44 holds the ball washer against the ball plate 42, thereby securely clamping the ball member 40 relative to the truck 24 at a desired location. As with the hitch post 26 described above, other configurations of ball assemblies other than the example ball assembly 28 may be used in conjunction with a hitch system of the present invention.

Figure 3:
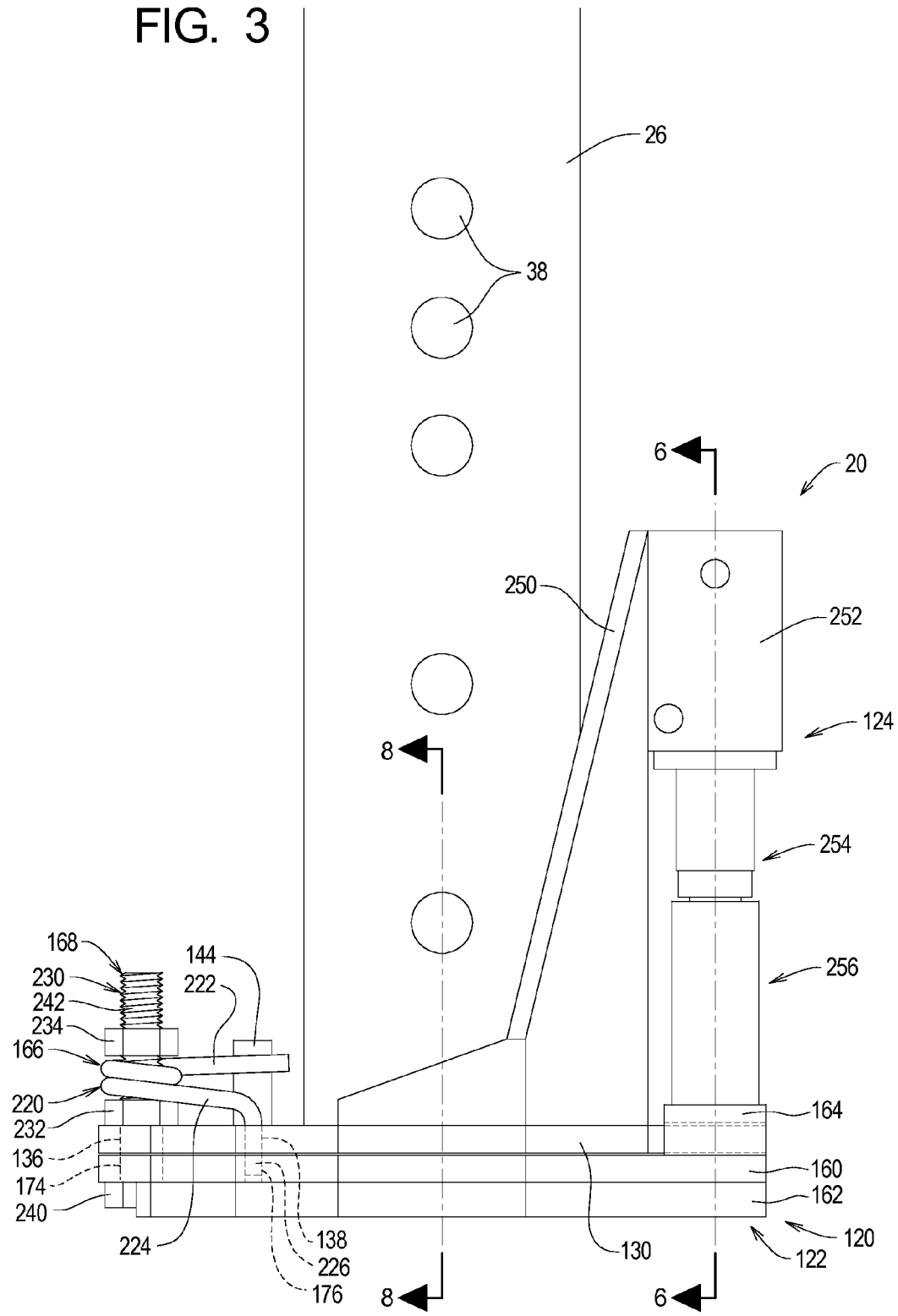
FIG. 3 is a front elevation view of the first example hitch system.

Turning now to the FIGS. 3 and 8, it can be seen that the first example hitch system 20 comprises a housing assembly 120, a hitch plate assembly 122, and an actuator assembly 124.

The housing assembly 120 comprises a housing plate 130 and a housing member 132. The housing plate 130 defines a first lock opening 134, a first bolt member opening 136, and a spring member opening 138. The housing plate 130 further defines a housing plate upper surface 140 and a housing plate lower surface 142. A stop member 144 extends from the upper surface 140 of the example housing plate 130. The housing plate 130 further defines a lock projection 146 in which the first lock opening 134 is formed. The housing member defines a housing member inner surface 150 and a housing member outer surface 152. The housing member inner surface 150 defines a housing chamber 154, and the housing member 132 is rigidly connected to the housing plate upper surface 140 such that a housing opening 156 formed in the housing plate 130 is aligned with the housing chamber 154. Additionally, the housing member outer surface 152 is sized and dimensioned to conform to the post wall inner surface 34. The housing member 132 is thus inserted within the post wall 30 such that the post lower edge 32 comes into contact with the housing plate upper surface 140. The housing assembly 120 is rigidly connected to the hitch post 26.

Figure 6:
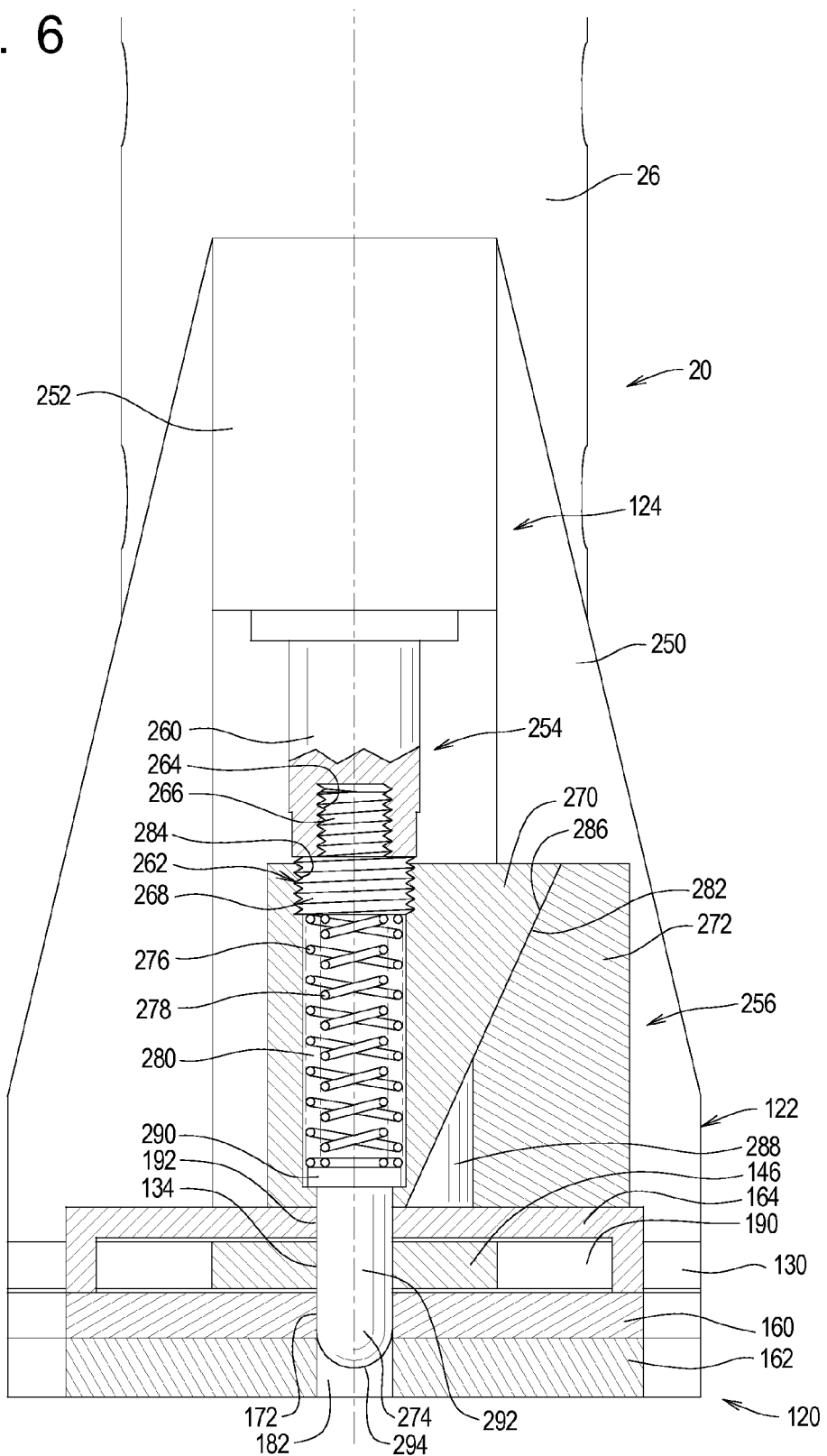
FIG. 6 is a section view taken along lines 6-6 in FIG. 3 showing the first example hitch system in the locked configuration.
Figure 7:
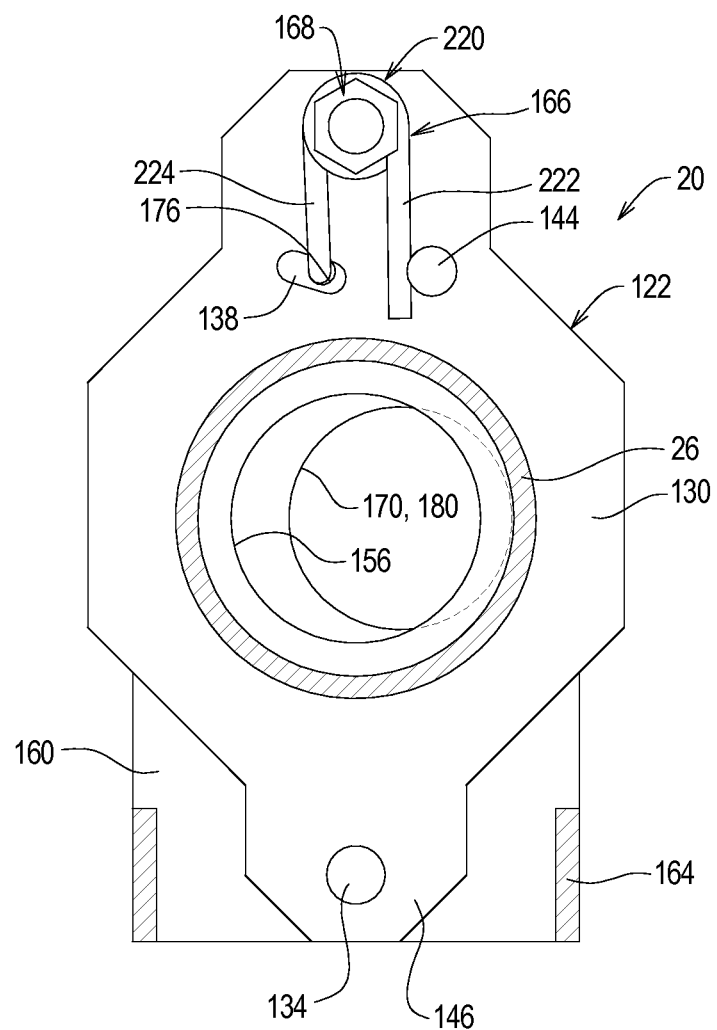
FIG. 7 is a section view taken along lines 7-7 in FIG. 2 showing the first example hitch system in the locked configuration.
Figure 9:
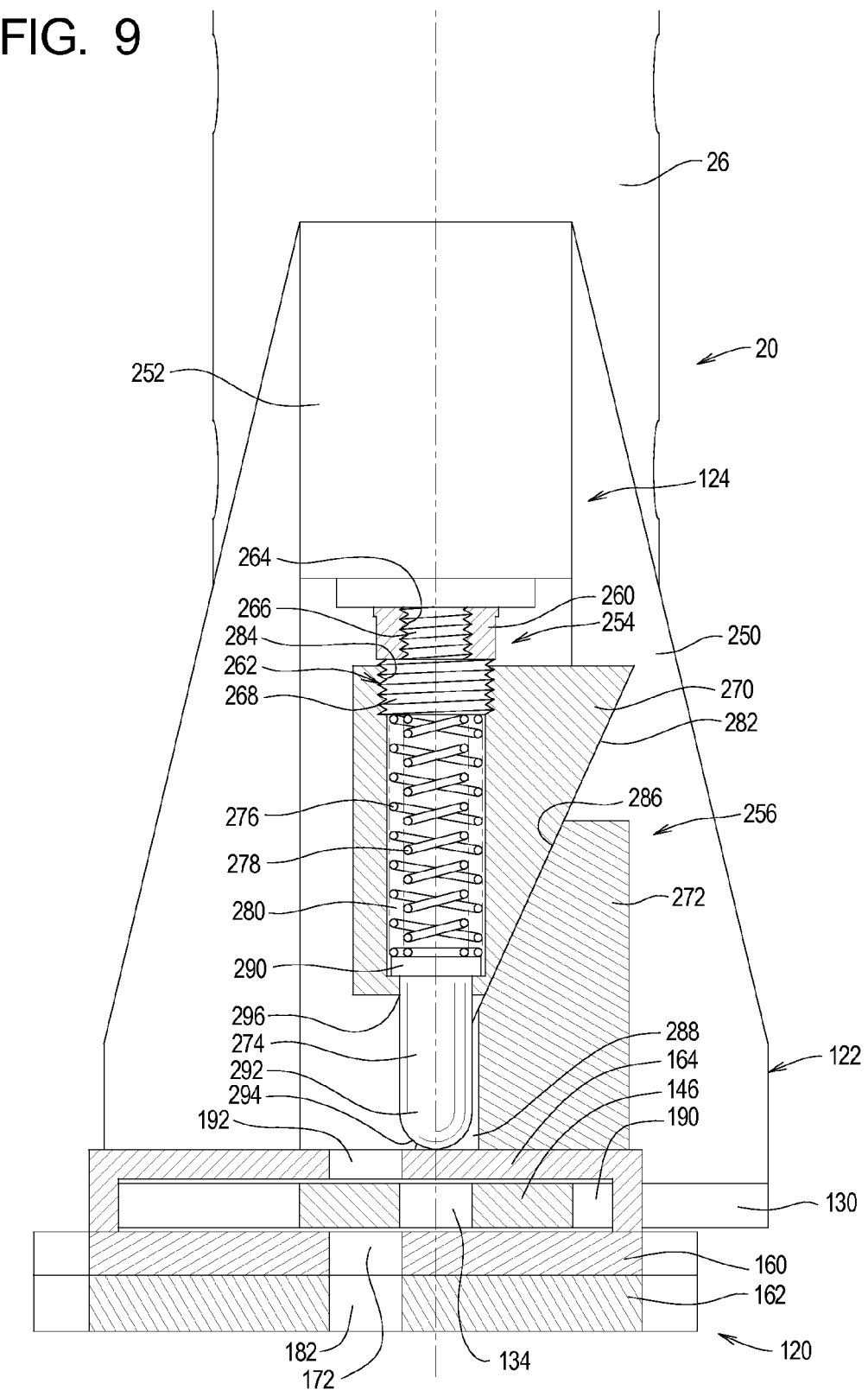
FIG. 9 is a section view similar to FIG. 6 showing the first example hitch system in an unlocked configuration.

FIG. 8 also shows that the example hitch plate assembly 122 comprises a hitch plate 160 and a guide plate 162. FIGS. 6 and 9 illustrate that the example hitch plate assembly 122 comprises a lock bracket 164. And FIG. 3 illustrates that the hitch plate assembly 122 further comprises a spring member 166 and a bolt assembly 168. FIG. 8 shows that the example hitch plate 160 defines a first ball opening 170, FIGS. 6 and 9 illustrate that example hitch plate 160 defines a second lock opening 172, and FIG. 3 illustrates that the example hitch plate 160 further defines a second bolt member opening 174 and a spring anchor opening 176. FIG. 8 also shows that the example guide plate 162 comprises a second ball opening 180, FIGS. 6 and 9 illustrate that the example guide plate 162 defines a third lock opening 182, and FIG. 5 illustrates that the example guide plate 162 defines a guide surface 184.

FIGS. 6 and 9 also illustrate that the example lock bracket 164 is a U-shaped member attached to an upper surface of the hitch plate 160 to define a lock gap 190. The example lock bracket 164 further defines a fourth lock opening 192. The example spring member 166 comprises a helical portion 220, a first arm portion 222, a second arm portion 224, and an anchor portion 226. The example bolt assembly 168 comprises a bolt member 230, a first nut 232, and a second nut 234. The bolt member 230 defines a head portion 240 and a threaded portion 242.

The example hitch plate assembly 122 is assembled as follows. The hitch plate 160 is arranged below and substantially coplanar with the housing plate lower surface 142. The bolt member 230 is inserted through the first bolt member opening 136 and the second bolt member opening 174 such that the bolt head portion 240 is in contact with the hitch plate 160. The first nut 232 is then engaged with the threaded portion 242 of the bolt member 230. The threaded portion 242 of the bolt member 230 is inserted into the helical portion 220 of the spring member 166 with: (a) the anchor portion 226 of the spring member 166 extending through the spring member opening 138 formed in the housing plate 130 and into the spring anchor opening 176 in the hitch plate 160; and (b) the first arm portion 222 of the spring member 166 engaging the stop member 144. The second nut 234 is then threaded onto the threaded portion 242 of the bolt member 230 to hold the spring member 166 on the bolt member 230.

Figure 10:
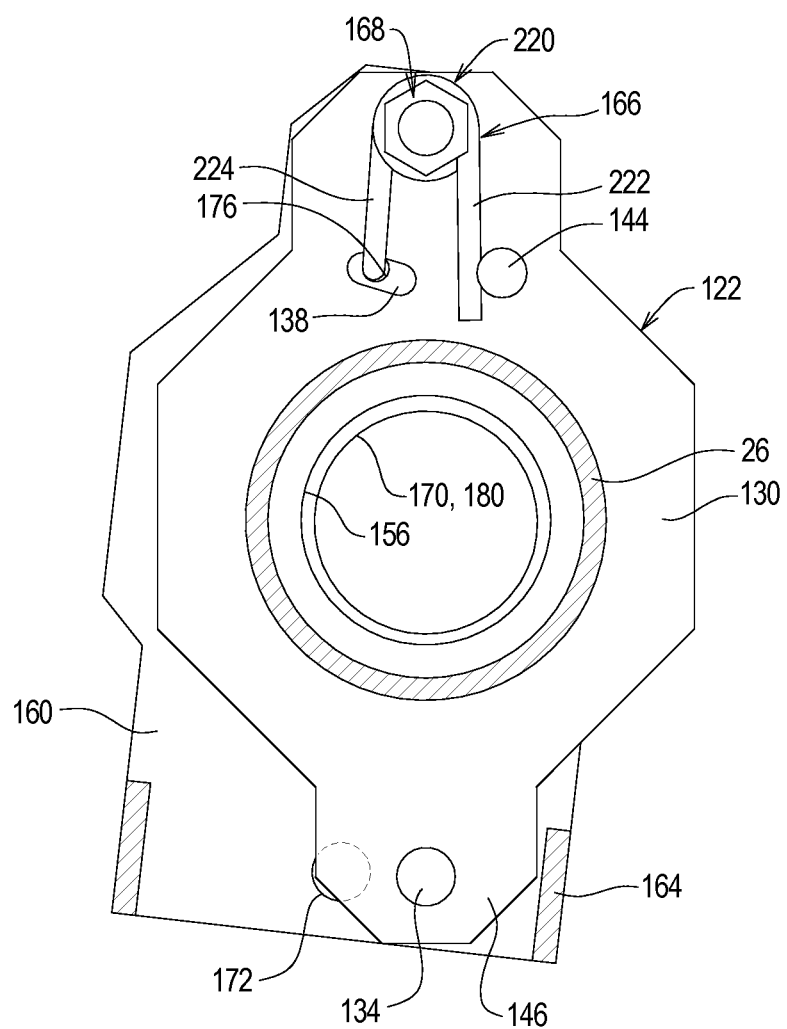
FIG. 10 is a section view similar to FIG. 7 showing the first example hitch system in the unlocked configuration.
Figure 11:
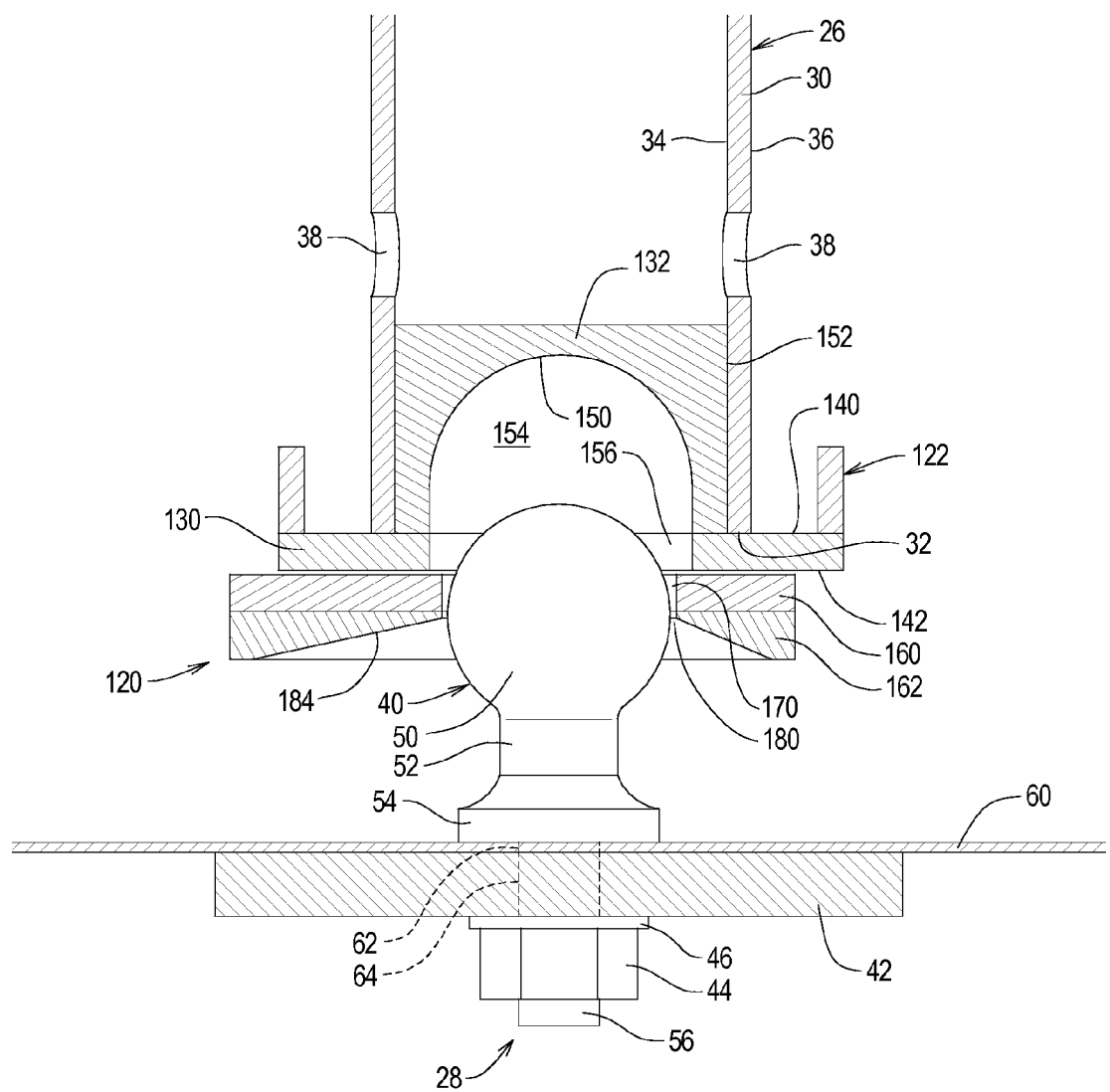
FIG. 11 is a section view similar to FIG. 8 showing the first example hitch system receiving the ball assembly in the unlocked configuration.

So assembled, the spring member 166 forms a torsion spring that biases the hitch plate 122 into an unhitched position relative to the housing assembly 120 (e.g., FIGS. 9-11). Alternatively, a tension spring may be configured to apply the biasing force on the hitch plate 122. By applying a locking force on the hitch plate 122, the hitch plate may be rotated or pivoted about a pivot axis defined by the bolt member 230 from the unhitched position into a hitched position relative to the housing assembly 120 (e.g., FIGS. 4-8).

Turning now to FIG. 3, it can be seen that the actuator assembly 124 comprises a stanchion 250, an actuator 252, a shaft assembly 254, and a cam assembly 256. The stanchion 250 is a rigid upright member or assembly capable of supporting the actuator 252, shaft assembly 254, and cam assembly 256 in a desired relationship as shown and described below.

The actuator 252 is or may be a conventional actuating system capable of linearly displacing the shaft assembly 254 using electrical energy directly or indirectly through a fluid medium such as hydraulics or pneumatics. The details of the example actuator 252 will thus not be described herein beyond what is necessary for a complete understanding of the present invention.

The shaft assembly 254 comprises a shaft member 260 and a coupler bolt 262. The shaft member 260 extends from the actuator 252 and defines a shaft threaded surface 264. The coupler bolt 262 defines first and second threaded portions 266 and 268. The first threaded portion 266 is sized and dimensioned to engage the shaft threaded surface 264.

The example cam assembly 256 comprises first and second cam members 270 and 272, a lock member 274, and a spring system comprising a first spring 276 and a second spring 278. The first cam member 270 defines a spring chamber 280, a first cam surface 282, and a cam threaded surface 284. The second threaded portion 268 of the coupler bolt 262 is sized and dimensioned to engage the cam threaded surface 284. The second cam member 272 defines a second cam surface 286 and a groove 288. The lock member 274 defines a flange portion 290, an engaging portion 292, and a tip portion 294.

The cam threaded surface 284 defines an upper portion of the spring chamber 280, and an engaging opening 296 is formed at a lower portion of the spring chamber 280. The lock member 274 is inserted into the spring chamber 280 through the upper portion defined by the cam threaded surface 284. The engaging portion 292 extends partly through the engaging opening 296, and the flange portion 290 prevents the lock member 274 from passing completely through the engaging opening 296. The example first and second spring members 276 and 278 are next inserted into the spring chamber 280 such that they are substantially coaxially aligned. The second threaded portion 268 of the coupler bolt 262 is engaged with the cam threaded surface 284 to secure the coupler bolt 262 to the first cam member 270. The coupler bolt 262 compresses the springs 276 and 278 such that the lock member 274 is biased into a locked position (FIG. 6) relative to the first cam member 270. In addition, the first threaded portion 266 of the coupler bolt 262 is engaged with the shaft threaded surface 264 to form the shaft assembly 254. At this point, the first cam member 270 is supported for movement relative to the actuator 252 along an actuator axis that extends through the actuator 252, shaft assembly 254, and the lock member 274.

The second cam member 272 is rigidly supported by the lock bracket 164 on the hitch plate 160 such that the first and second cam surfaces 282 and 286 are arranged at complementary angles with respect to the actuator axis. In addition, as generally described above the spring member 166 biases the hitch plate 160 relative to the housing plate 130. Accordingly, the biasing force applied to the hitch plate 160 relative to the housing plate 130 forces the second cam surface 286 towards the first cam surface 282 during normal operation of the hitch system 20.

During operation of the hitch system 20, the actuator 252 displaces the first cam member 270 between a retracted position (e.g., FIG. 9) and an extended position (e.g., FIG. 6). The example hitch system 20 is in the locked configuration when the first cam member 270 is in the extended position and in the unlocked configuration when the first cam member 270 is in the retracted position.

If the user is using the hitch system 20 to secure the trailer 22 to the truck 24, the user starts with the example hitch system 20 in the unlocked configuration (FIGS. 9 and 11). In particular, when the example hitch system 20 is in the unlocked configuration (FIGS. 9 and 11), the first and second ball openings 170 and 180 are aligned with the housing opening 156, and the ball portion 50 of the ball member 40 may freely pass through these openings 156, 170, and 180 into and out of the housing chamber 154. Accordingly, to secure the trailer 22 to the truck 24, one or both of the trailer 22 and truck 24 are displaced until the ball portion 50 enters the housing chamber 154 with the hitch system 20 in the unlocked configuration.

The user then operates the actuator 252 to extend the shaft assembly 254 and thus displace the first cam member 270 along the actuator axis relative to the actuator 252. Because the stanchion 250 is fixed relative to the housing plate 130, the actuator axis is fixed relative to the housing plate 130. Accordingly, as the first cam member 270 moves along the actuator axis, the first cam surface 282 acts on the second cam surface 286, displacing the second cam member 272 away from the actuator axis. Because the second cam member 272 is fixed relative to the lock bracket 164 and thus the hitch plate 160, displacement of the second cam member 272 away from the actuator axis causes rotation or pivoting of the hitch plate 160 relative to the housing plate 130 such that the first and second ball openings 170 and 180 are no longer aligned with the housing opening 156.

Figure 12:
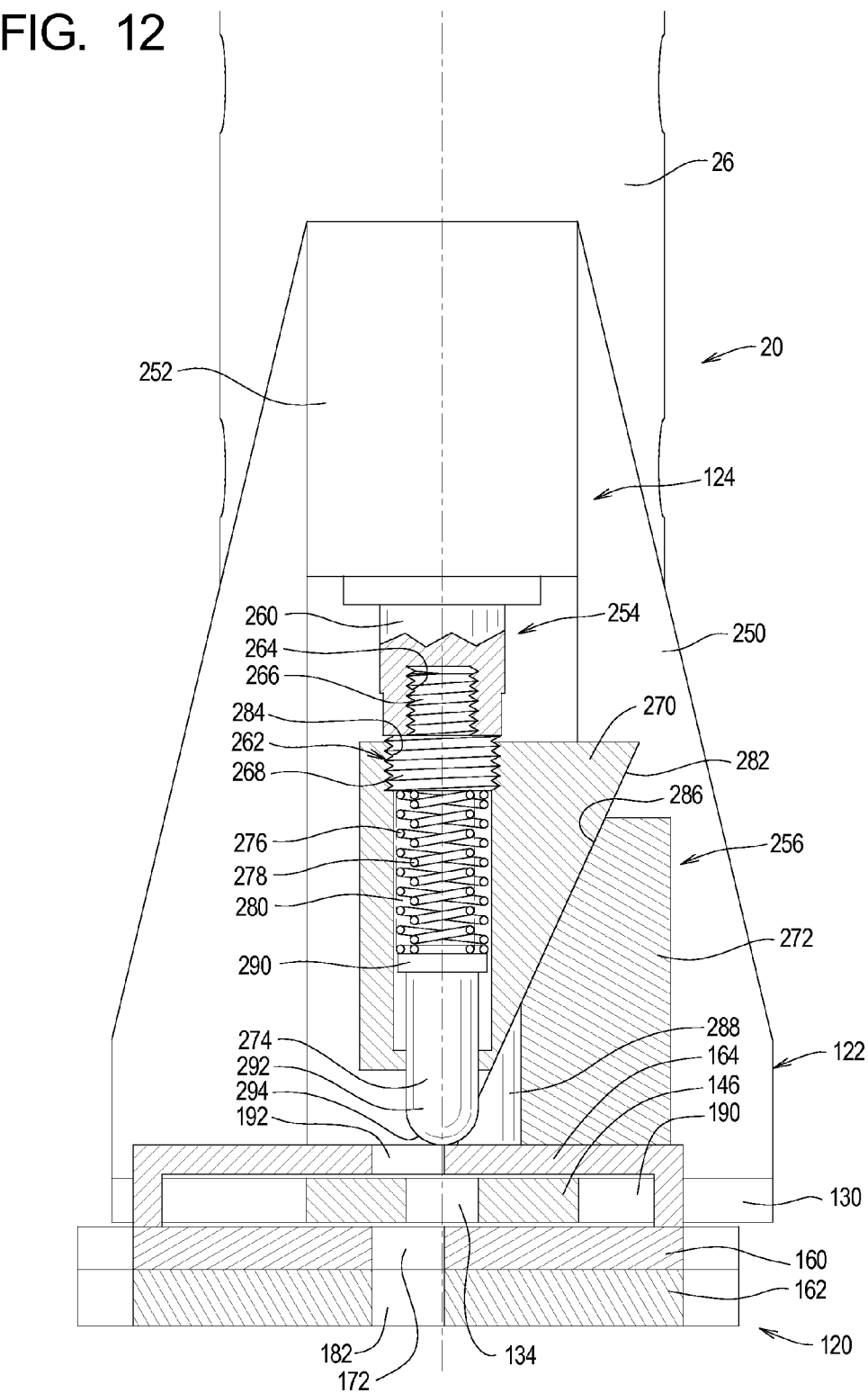
FIG. 12 is a section view similar to FIGS. 6 and 9 showing the first example hitch system in an intermediate configuration between the locked and unlocked configurations.
Figure 14:
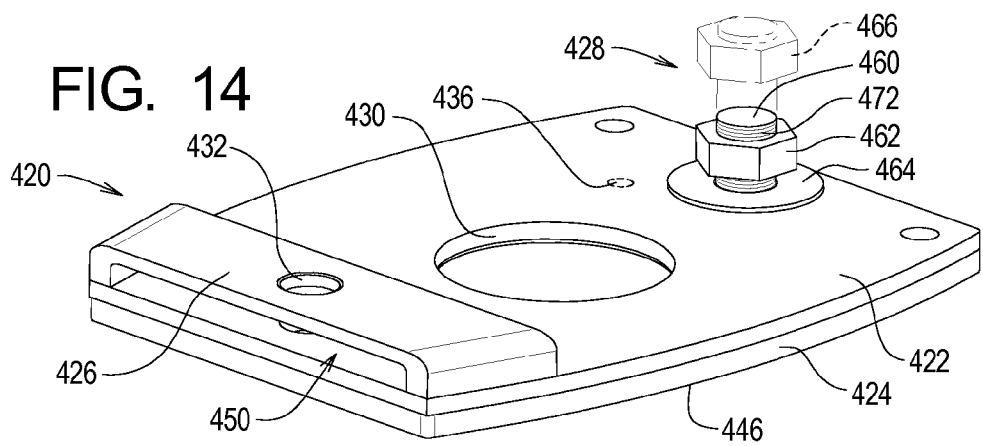
FIG. 14 is a perspective view of a second example hitch plate assembly that may be used by the first example hitch system.
Figure 15:
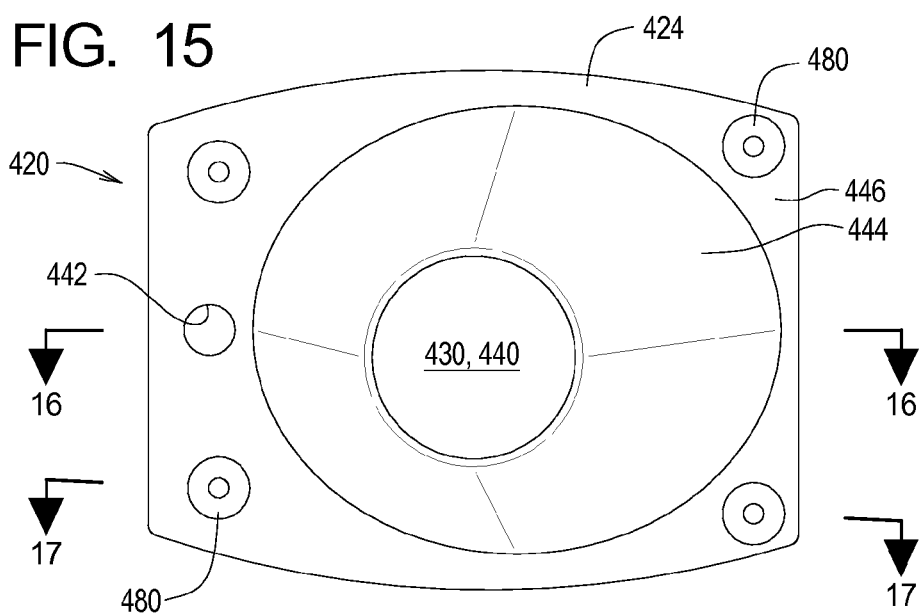
FIG. 15 is a bottom plan view of the second example hitch plate assembly.
Figure 16:
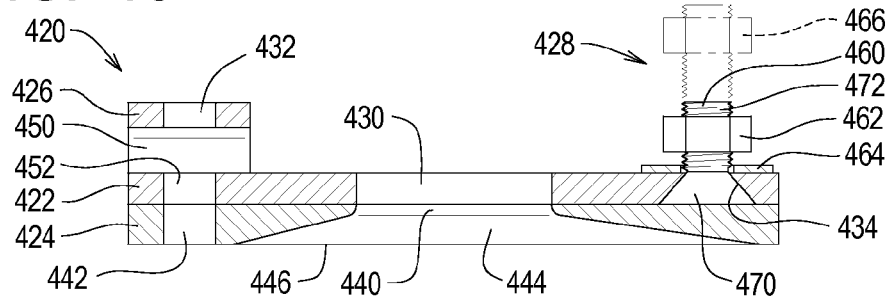
FIG. 16 is a section view of the second example hitch plate assembly taken along lines 16-16 in FIG. 15.
Figure 17:
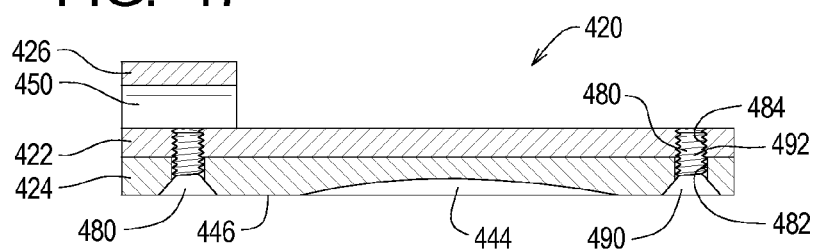
FIG. 17 is a section view of the second example hitch plate assembly taken along lines 17-17 in FIG. 15.

To allow the downward movement of the first cam member 270 relative to the second cam member 272 before the first, second, third, and fourth lock openings 134, 172, 182, and 192 are aligned, the lock member 274 compresses the springs 276 and 278 as shown by a comparison of FIGS. 9 and 12. As these lock openings 134, 172, 182, and 192 begin to align, the curved tip portion 294 of the lock member 274 begins to enter the fourth lock opening 192. When the lock openings 134, 172, 182, and 192 are completely aligned with the actuator axis, the springs 276 and 278 immediately force the lock member 274 along the actuator axis and through the lock openings 134, 172, 182, and 192 as shown in FIG. 6. At this point, as perhaps best shown in FIGS. 4, 5, and 8, the first and second ball openings 170 and 180 are fully misaligned with the housing opening 156. The distance between the closest portions of the openings 170 and 180 and the opening 156 is shorter than the diameter of the ball portion 50 of the ball member 40. The misalignment of the openings 170, 180 with the opening 156 thus prevents passage of the ball portion 50 of the ball member 40 out of the housing chamber 154. The hitch system 20 is now in its hitched configuration, and the trailer 22 is securely hitched to the truck 24.

To place the hitch system 20 from the hitched configuration into the unhitched configuration, the actuator 252 is operated to retract the shaft assembly 254 and thus move the first cam member 270 along the actuator axis relative to the second cam member 272. Until the lock member 274 exits the first lock opening 134, the first cam member 270 moves relative to the lock member 274 by compressing the springs 276 and 278. And until the lock member 274 exits the first lock opening 134, the first cam member 270 moves up, but the hitch plate 160 and thus the second cam member 272 are prevented from rotating or pivoting about the pivot axis, allowing a small gap to develop between the first and second cam surfaces 282 and 286. Once the lock member 274 clears the first lock opening 134, the hitch plate 160 rotates about the pivot axis relative to the housing plate 130 until the first and second cam surfaces 282 and 286 come into contact with each other (see, e.g., FIG. 12). Further retraction of the actuator 252 allows the hitch plate 160 to continue rotating relative to the housing plate 130 until the first and second ball openings 170 and 180 are aligned with the housing opening 156, at which point the hitch system 20 is in the unhitched configuration as show, for example, in FIGS. 9 and 11.

As perhaps best shown in FIGS. 5 and 11, the guide surface 184 defined by the guide plate 162 is angled towards the second ball opening 180 to guide the ball through the second ball opening 180 and thus eventually through the first ball opening 170 and the housing opening 156 and into the housing chamber 154. The example guide plate 162 is made of UHMW polyethylene material that is low in friction and replaceable when worn, but other materials having a desired combination of coefficient of friction and wear resistance may be used instead of UHMW. For example, the guide plate 162 may be made of a fluorocarbon solid such as polytetrafluoroethylene (PTFE or Teflon), high-density polyethylene (HDPE), UHMW polyethylene filled with ceramic particles, polyamide (Nylon), molybdenum disulphide-filled 6/6 nylon (Nylatron), or Delrin. If PTFE is used, lubricants such as mineral oil or molybdenum disulfide may be embedded within the PTFE matrix to provide reduced coefficient of friction. In any event, the material from which the guide plate 162 is formed should have a coefficient of friction, coefficient of thermal expansion, hardness, impact strength, compressive strength, and water absorption within a first range of ±5% of one or more (at least one) of the range of values for those properties of UHMW PE and in any event should be within a second range of ±10% of one or more (at least one) of the range of values for those properties of UHMW PE. At least the coefficient of friction, compressive strength, and water absorption will be within those ranges for a material selected for use as the example guide plate 162.

A retainer may be used to secure the guide plate 162 to the hitch plate 160. If used, the retainer should is secured to the hitch plate 160 by screws or the like and extends around the perimeter of the guide plate 162 to secure the guide plate 162 in position relative to the hitch plate 160.

Referring now to FIGS. 13A and 13B, depicted therein are the actuator 252 and shaft member 260 of the actuator assembly 124. FIGS. 13A and 13B further illustrate that the actuator assembly 124 will typically comprise a motor 320 and may comprise a controller 322 operatively connected to the motor 320 by a communications system 324. As generally described above, the motor 320 may directly displace the shaft member 260 or may indirectly displace the shaft member 260 using a pump, working fluids, and/or conduit. In an all electric version, the motor 320 will take the form of a linear actuator. In a hydraulic system, the motor 320 will take the form of a pump. In a pneumatic system, the motor 320 will take the form of a compressor, storage tank, and valve.

The example motor 320 is operated based the orientation of a control switch 330 relative to first and second indicia 332 and 334 on the controller 322. In particular, an indicator 336 of the control switch 330 may point to the first indicia 332 to place the hitch system 20 in the hitched configuration and to the second indicia 334 to place the hitch system 20 in the unhitched configuration.

The controller 322 may be mounted on the motor 320, but, more conveniently, the controller 322 is remote from the motor 320. The communications system 324 may be any system for allowing a setting of the control switch 330 to be communicated to the motor 320. For example, the communications system 324 may incorporate a wire for transmitting electrical control signals between the controller 322 and the motor 320. Alternatively, the communications system 324 may employ wireless technology to allow the transmission of control signals between the controller 322 and the motor 320.

Further, the communications system 324 may allow bidirectional data communication between the hitch system 20 and the controller 322. In this case, sensors may be included in the hitch system as appropriate to detect faults, locations, status, and the like. In this case, the controller 324 may be provided with lights, a display, sound generation, or other means for communicating to the user the data generated by such sensors.

Additionally, governmental regulations often require that, in addition to using the hitch assembly 20 to connect the trailer 22 to the truck 24, a chain assembly be connected between the trailer 22 and the truck 24. To allow the example hitch system 20 to be formed, including connection of the chain assembly, from outside of the bed of the truck, the chain assembly may be arranged as follows. The chain assembly comprises first and second lengths of chain 340 and 342, each length having first and second clips 350 and 352 and 354 and 356 formed on opposite ends, respectively. The clip 350, 354 on one end of each chain 340 and 342 is connected to a D-ring 360, 362 securely mounted to the truck, typically adjacent to the ball member 40. The clips 352 and 356 on the other end of each chain 340 and 342 are connected to eye bolts 370, 372 or other structures securely attached to the structural frame of the trailer 22 adjacent to the side edges of the trailer. The clips 352, 356 on the chains 340, 342 may be connected to these eye bolts 370, 372 without climbing into the truck bed under the trailer. When not attached to the eye bolts 370, 372 (e.g., when the trailer is disconnected from the truck), the clips 352, 356 may be attached to the side of the truck bed for easy access when they are next to be reattached to the eye bolts 370, 372.

Turning now to FIGS. 14-17 of the drawing, depicted therein is a second example hitch plate assembly 420. The example hitch plate assembly 420 is specifically designed as an aftermarket accessory for a commercially available hitch system commonly referred to as the Bulldog Gooseneck Coupler. The example hitch plate assembly 420 is pivotably connected to the Bulldog Gooseneck Coupler as will be described in further detail below. With minor modification as will also be described below, the example hitch plate assembly 420 may also be adapted for use as part of the first example hitch system 20 as described above. In particular, a slightly modified version of the second example hitch plate assembly 420 may be substituted for the first example hitch plate assembly 122 described above.

FIGS. 14-17 illustrate that the example hitch plate assembly 420 comprises a hitch plate 422, a guide plate 424, and a lock bracket 426. Like the first example hitch plate assembly 122, when fully assembled the second hitch plate assembly 420 further comprises a bolt assembly 428 and, optionally, a spring member like the spring member 166 described above. The spring member is not depicted in FIGS. 14-17 for clarity. The example hitch plate 422 further defines a first ball opening 430, a second lock opening 432, a second bolt member opening 434, and, optionally, a spring anchor opening 436. The example guide plate 424 defines a second ball opening 440, a third lock opening 442, a guide surface 444, and a bottom surface 446.

Like the example lock bracket 164 described above, the example lock bracket 426 is a U-shaped member attached to an upper surface of the hitch plate 422 to define a lock gap 450. The example lock bracket 426 further defines a fourth lock opening 452. The example bolt assembly 428 comprises a bolt member 460, a first nut 462, a washer 464, and, optionally, a second nut 466. The bolt member 460 defines a head portion 470 and a threaded portion 472. The example bolt member opening 434 is flared or countersunk, and the example head portion 470 is also flared to complement the bolt member opening 434.

The example guide plate 424 is secured to the hitch plate 422 using a plurality of screws 480 that extend through retaining holes 482 formed in the guide plate 424 and engage threaded holes 484 formed in the hitch plate 422. Each of the screws 480 defines a head portion 490 and a threaded portion 492. The example retaining holes 482 are flared or countersunk, and the example head portions 490 are also flared to complement the retaining holes 482. The head portions 490 of the screws 480 are flush with, or perhaps internally offset from (e.g., within the retaining holes 482), the bottom surface 446 of the guide plate 424.

The bolt member 460, first nut 462, and washer 464 are used to pivotably attach the second hitch plate assembly 420 to the Bulldog Gooseneck Coupler. By altering the top plan form factor of the second example hitch plate assembly 420 to conform to that of the first example hitch plate assembly 122 described above (e.g., FIG. 5), lengthening the bolt member 460 as shown by dotted lines in FIGS. 14 and 16, and providing the optional spring member, the optional spring anchor opening 436, and the optional second nut 466, the second hitch plate assembly 420 may be used in place of the first example hitch plate assembly 122 as part of the hitch system 20 described above.

Figure 18:
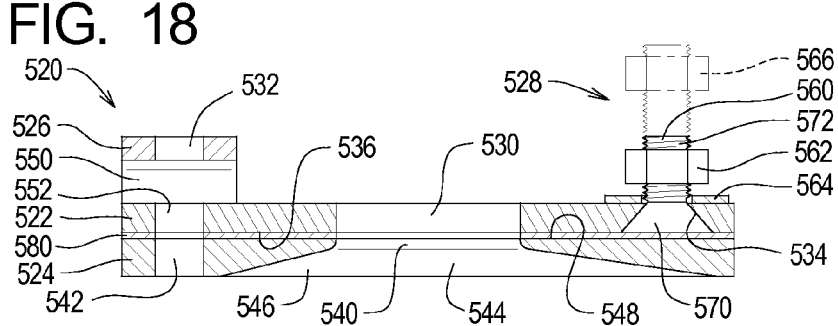
FIG. 18 is a section view similar to that of FIG. 16 depicting a third example hitch plate assembly that may be used with the first example hitch system.

Turning now to FIG. 18 of the drawing, depicted therein is a third example hitch plate assembly 520. Like the example hitch plate assembly 420, the example hitch plate assembly 520 is specifically designed as an aftermarket accessory to be pivotably connected to the Bulldog Gooseneck Coupler. Like the second example hitch plate assembly 420, a modified version of the third example hitch plate system 520 may be substituted in the hitch system 20 for the first example hitch plate assembly 122 as described above. The third example hitch plate assembly 520 can or may be the same in many respects as the second example hitch plate assembly 420 and will be described herein only to that extent necessary for a complete understanding of the present invention.

FIG. 18 illustrates that the third example hitch plate assembly 520 comprises a hitch plate 522, a guide plate 524, and a lock bracket 526. When fully assembled, the third hitch plate assembly 520 further comprises a bolt assembly 528 and, optionally, a spring member like the spring member 166 described above. The spring member is not depicted in FIG. 18 for clarity. The example hitch plate 522 further defines a first ball opening 530, a second lock opening 532, a second bolt member opening 534, a bottom surface 536, and an optional spring anchor opening (not visible in FIG. 18). The example guide plate 524 defines a second ball opening 540, a third lock opening 542, a guide surface 544, a bottom surface 546, and a top surface 548.

Like the example lock bracket 164 described above, the example lock bracket 526 is a U-shaped member attached to an upper surface of the hitch plate 522 to define a lock gap 550. The example lock bracket 526 further defines a fourth lock opening 552. The example bolt assembly 528 comprises a bolt member 560, a first nut 562, a washer 564, and, optionally, a second nut 566. The bolt member 560 defines a head portion 570 and a threaded portion 572. The example bolt member opening 534 is flared or countersunk, and the example head portion 570 is also flared to complement the bolt member opening 534.

The example guide plate 524 is secured to the hitch plate 522 using a layer 580 of adhesive. The adhesive layer 580 is formed by an adhesive capable of bonding to the bottom surface 536 of the hitch plate 522 to the top surface 548 of the guide plate 524. In a typical case where the guide plate 524 is UHMW polyethylene and the hitch plate is metal, the adhesive used to form the adhesive layer 580 will be formulated to bond these two different materials together. Heat and/or pressure may be used during the process of forming the adhesive layer 580.

The bolt member 560, first nut 562, and washer 564 are used to pivotably attach the second hitch plate assembly 520 to the Bulldog Gooseneck Coupler. By altering the top plan form factor of the second example hitch plate assembly 520 to conform to that of the first example hitch plate assembly 122 described above (e.g., FIG. 5), lengthening the bolt member 560 as shown by dotted lines in FIGS. 14 and 16, and providing the optional spring member, the optional spring anchor opening 536, and the optional second nut 566, the second hitch plate assembly 520 may be used in place of the first example hitch plate assembly 122 as part of the hitch system 20 described above.

Figure 19:
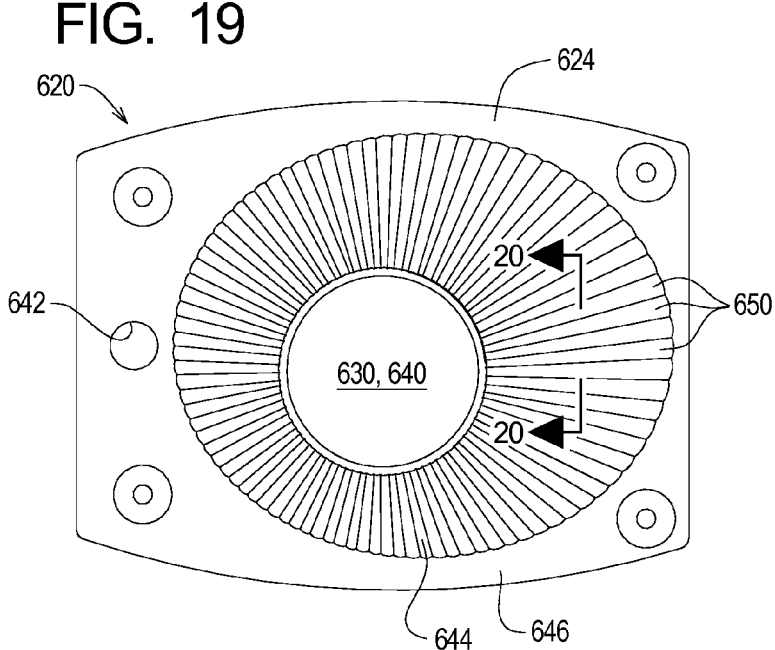
FIG. 19 is a bottom plan view similar to FIG. 15 illustrating a fourth example hitch plate assembly that may be used with the first example hitch system.
Figure 20:
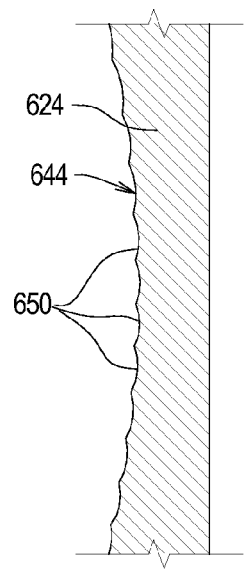
FIG. 20 is a section view of the fourth example hitch plate assembly taken along lines 20-20 in FIG. 19.
Figure 21:
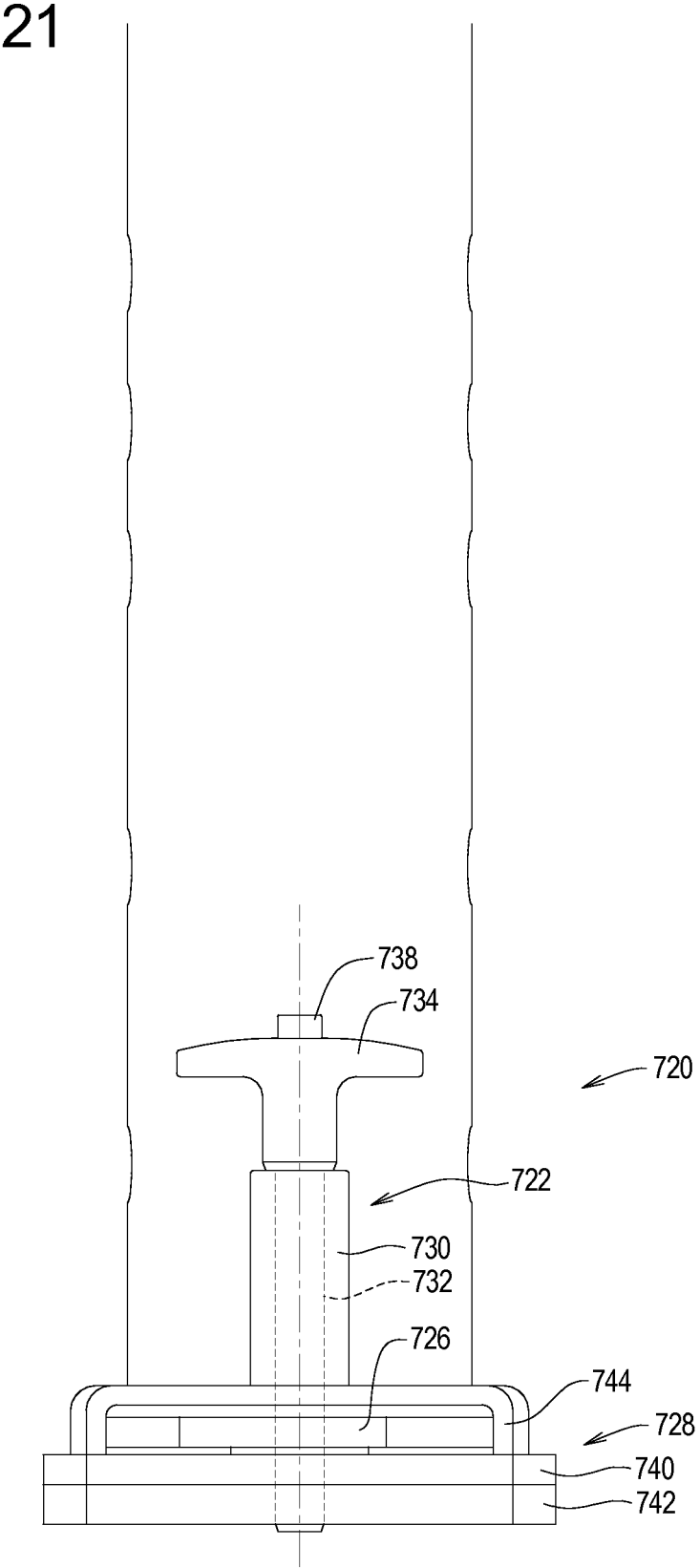
FIG. 21 is a left side elevation view of a second example hitch system of the present invention.
Figure 22:
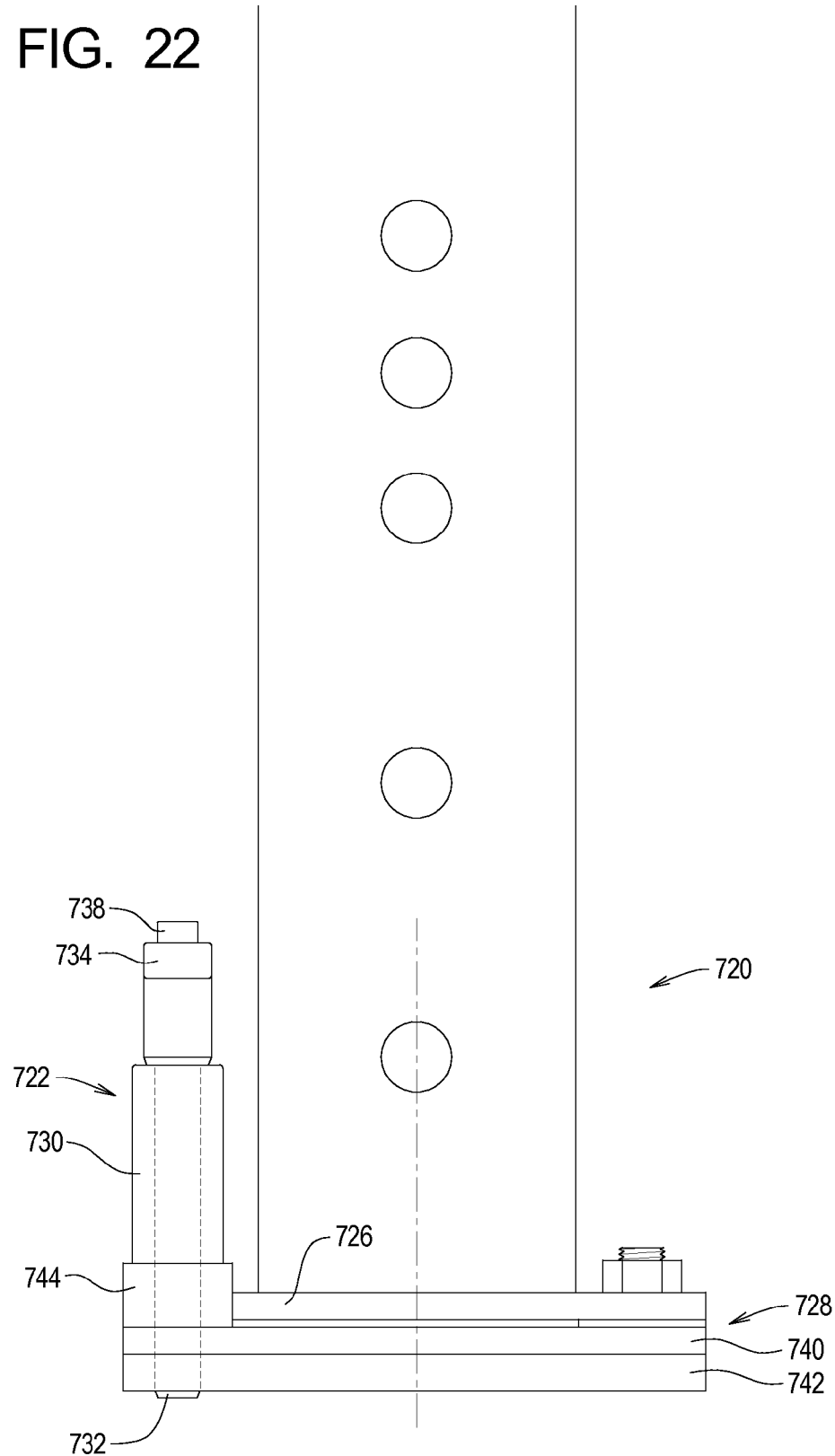
FIG. 22 is a front elevation view of the second example hitch system.

Turning now to FIGS. 19 and 20 of the drawing, depicted therein is a fourth example hitch plate assembly 620. Like the example hitch plate assemblies 420 and 520, the example hitch plate assembly 620 is specifically designed as an aftermarket accessory to be pivotably connected to the Bulldog Gooseneck Coupler. Like the second and third example hitch plate assemblies 420 and 520, the fourth example hitch plate system 620 may be substituted in the hitch system 20 for the first example hitch plate assembly 122 described above. The third example hitch plate assembly 620 can or may be the same in many respects as the example hitch plate assemblies 420 and 520 and will be described herein only to that extent necessary for a complete understanding of the present invention.

FIG. 19 illustrates that the third example hitch plate assembly 620 comprises a hitch plate (not visible), a guide plate 624, and a lock bracket (not visible). When fully assembled, the fourth hitch plate assembly 620 further comprises a bolt assembly (not visible) like any of the bolt assemblies 168, 428, and/or 528 described above and, optionally, a spring member like the spring member 166 described above. The bolt assembly and optional spring member are not depicted in FIGS. 19 and 20 for clarity. The example hitch plate further defines a first ball opening 630. The example guide plate 624 defines a second ball opening 640, a third lock opening 642, a guide surface 644, and a bottom surface 646.

FIGS. 19 and 20 illustrate that the guide surface 644 is formed by a plurality of grooves 650 extending outwardly from the second ball opening 640 and terminating at the bottom surface 646. The example grooves 650 have a first dimension adjacent to the second ball opening 540 and a second dimension adjacent to the bottom surface 546, where the second dimension is slightly larger than the first dimension. FIG. 20 further illustrates that the grooves 550 are rounded; the rounded shape of the grooves 550 in cross-section yields a scalloped edge of the bottom surface 546.

The Applicant has found that the grooves 550 tend to direct the ball towards the second ball opening 540 when attaching a trailer to a vehicle using a hitch system such as the hitch system 20 incorporating the example hitch plate assembly 620.

The bolt assembly is used to pivotably attach the second hitch plate assembly 620 to the Bulldog Gooseneck Coupler. By altering the top plan form factor of the second example hitch plate assembly 620 to conform to that of the first example hitch plate assembly 122 described above (e.g., FIG. 5), lengthening the bolt member of the bolt assembly, and providing the optional spring member, the optional spring anchor opening, and the optional second nut of the bolt assembly, the second hitch plate assembly 620 may be used in place of the first example hitch plate assembly 122 as part of the hitch system 20 described above.

Referring now to FIGS. 21-24, depicted therein is a second example hitch system 720 comprising a lock assembly 722. The example hitch system 720 defines a main lock opening 724 formed in lock plate 726. The lock plate projection 726 and lock opening formed therein can be similar to the first lock opening 134 formed the lock plate 146 described above and will not be described again in detail. The example hitch system 720 further comprises a hitch plate assembly 728.

The example lock assembly 722 comprises a lock housing 730, a lock member 732, a handle 734, one or more detent balls 736, and a detent release button 738. The example hitch plate assembly 728 is similar to the example hitch plate assembly 520 described above. In particular, the example hitch plate assembly comprises a hitch plate 740, a guide plate 742, and a lock bracket 744 similar to the hitch plate 522, guide plate 524, and lock bracket 526 described above. A hitch plate opening 750 is formed in the hitch plate 740, a guide plate opening 752 is formed in the guide plate 742, and a lock bracket opening 754 is formed in the lock bracket 744.

Figure 23:
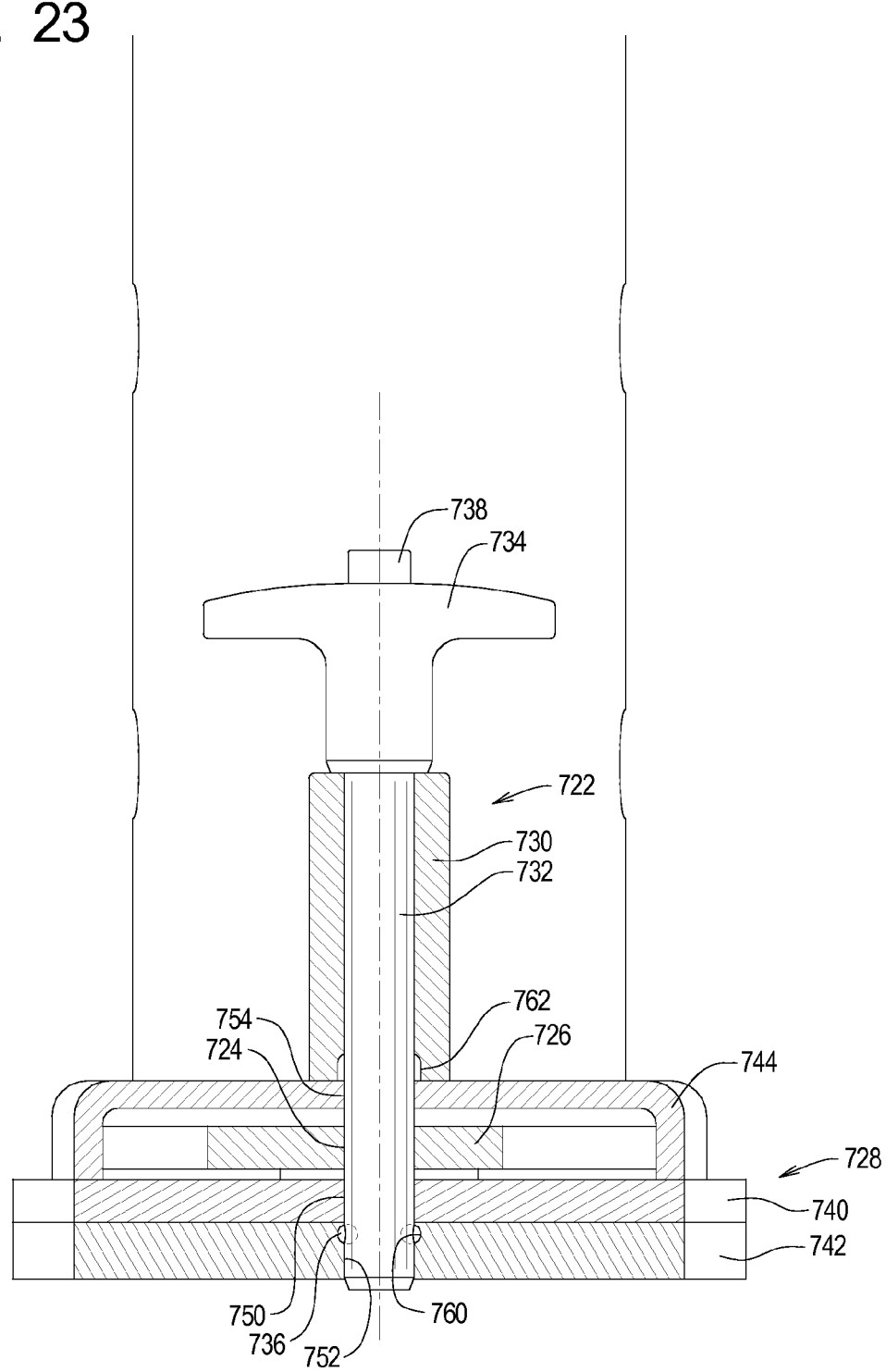
FIG. 23 is a section view of a lock assembly of the second example hitch system, with the lock assembly being in a latched configuration.
Figure 24:
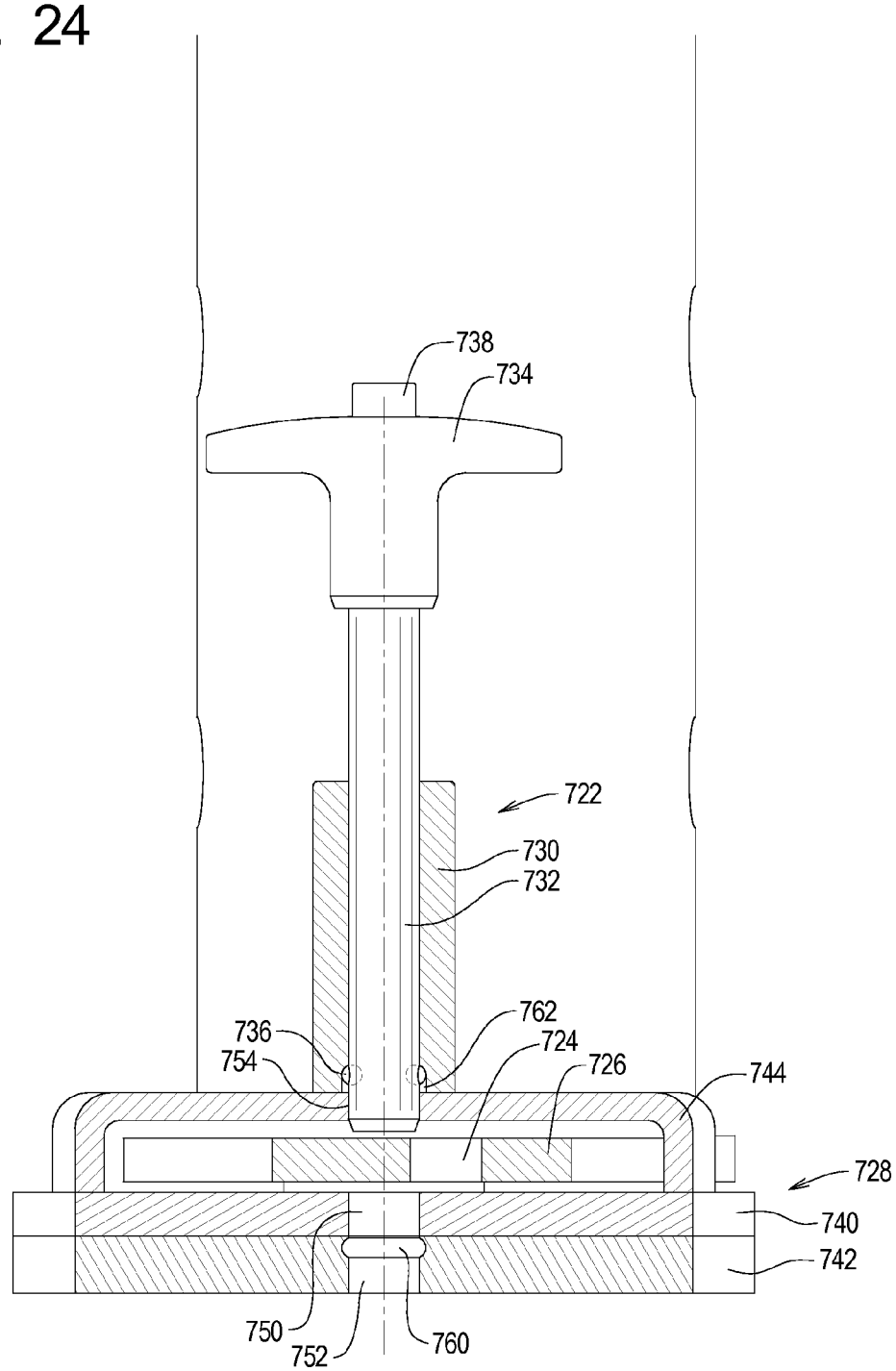
FIG. 24 is a section view of the lock assembly of the second example hitch system, with the lock assembly being in an unlatched configuration.

The example lock housing 730 is supported on the lock bracket 744, and the lock member 732 is supported by the lock housing 730 for movement between lower and upper positions as shown in FIGS. 23 and 24, respectively. In the upper position, the lock assembly 722 is in an unlocked position and the lock member 732 is not within the main lock opening 724, the hitch plate opening 750, or the guide plate opening 752. In the lower position, the lock assembly 722 is in a locked position and the lock member 732 extends through the main lock opening 724, the hitch plate opening 750, and at least partly through the guide plate opening 752.

A detent groove 760 is formed in the guide plate 742, and a detent recess 762 is formed in the lock housing 730. In the locked position, the detent ball(s) 736 are resiliently biased out of the lock member 732 to extend from the lock member 732 and engage the detent groove 760 to secure the lock member 732 in the locked position. Pushing on the detent release button 738 allows the detent ball(s) to be pushed into the lock member 732, allowing the lock member 732 to be displaced from the locked position to the unlocked position. In the unlocked position with the detent release button 738 released, the detent ball(s) 736 are resiliently biased out of the lock member 732 to extend from the lock member 732 and engage the detent recess 762 to secure the lock member 732 in the unlocked position. Pushing again on the detent release button 738 allows the detent ball(s) to be pushed into the lock member 732, allowing the lock member 732 to be displaced from the unlocked position to the locked position. The handle 734 facilitates displacement of the lock member 732 between the locked and unlocked positions.

The construction and operation of the lock member 732, detent ball(s) 736, and detent release button 738 are or may be conventional and will not be described herein in further detail.

Figure 25:
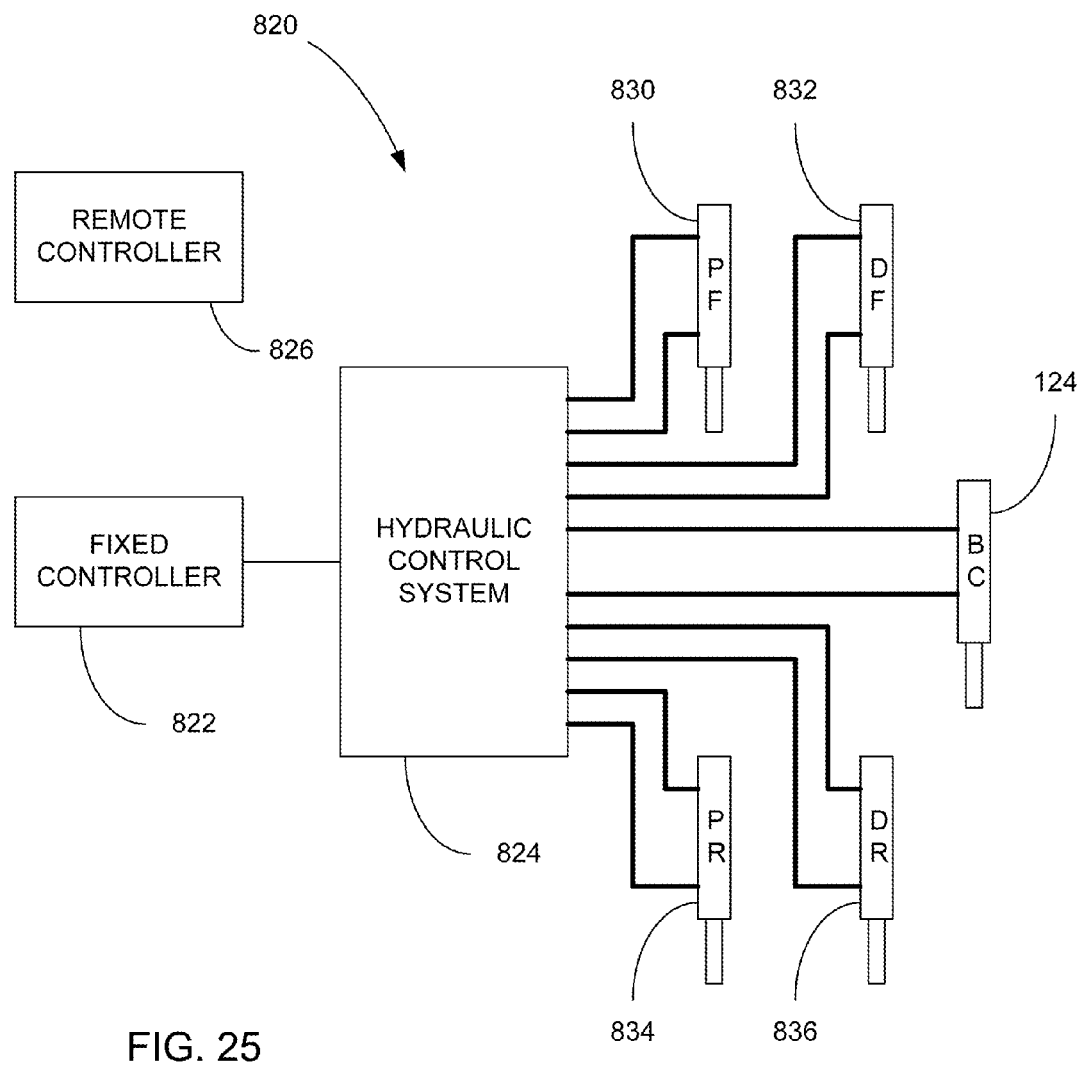
FIG. 25 is a schematic view of an example control system that may be used with a hitch system of the present invention.
Figure 26:
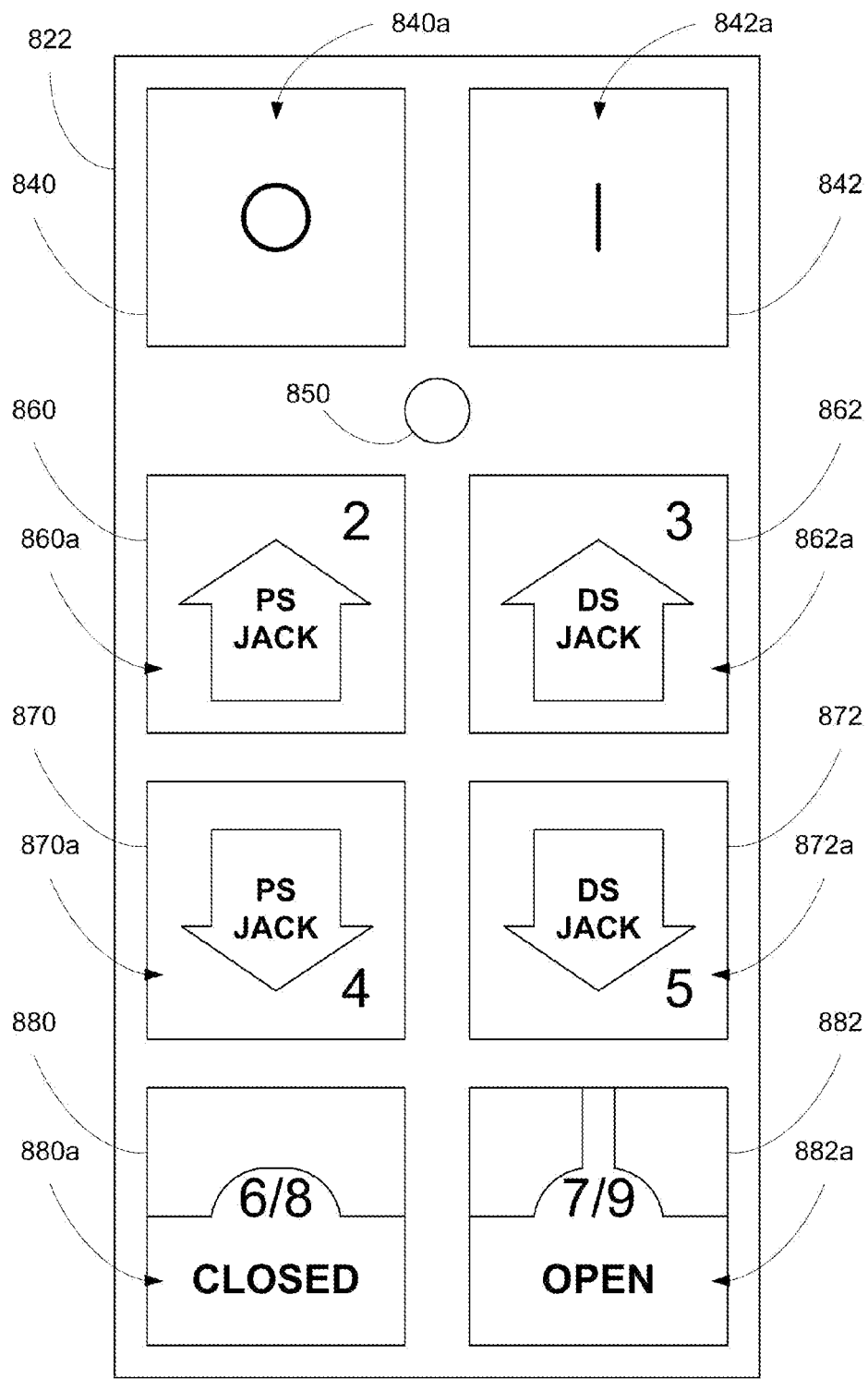
FIG. 26 is a front elevation view of a first controller of the example control system of FIG. 25.
Figure 27:
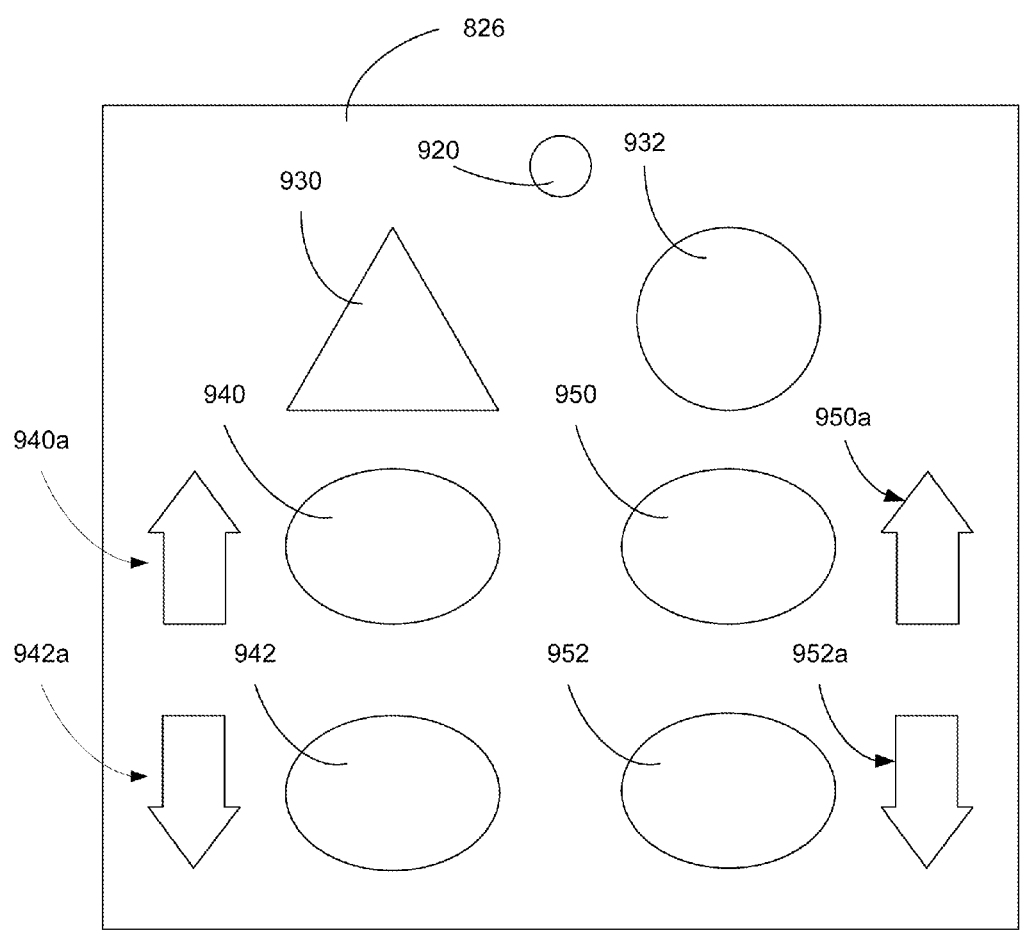
FIG. 27 is a front elevation view of a second control of the example control system of FIG. 26.

Referring now to FIGS. 25-27 of the drawing, schematically depicted in FIG. 25 is an example control system 820 that may be used by the first example hitch system 20. In particular, FIG. 25 illustrates that the example control system 820 comprises an example first controller 822 that is electrically connected to hydraulic control system 824. A second controller 826 capable of wireless communication of data with the first controller 822 may be provided. Any appropriate wireless communication system may be provided to allow communication between the second controller 826 and the first controller 822. The example first controller 822 and second controller 826 may be used instead of the control switch 330 depicted and described above.

The example hydraulic control system 824 is or may be conventional and is hydraulically connected to a plurality of actuators forming part of leg jack assemblies of the trailer 22. The example hydraulic control system 824 comprises a first actuator 830 and a second actuator 832. Optionally, a third actuator 834 and a fourth actuator 836 may be provided as discussed above. The hydraulic control system 824 is further hydraulically connected to an actuator of the example hitch system 20 such as the actuator assembly 124 described above.

A front elevation view of the example first controller 822 is depicted in FIG. 26. As shown, the example first controller 822 comprises first and second switches 840 and 842, an indicator light 850, third and fourth switches 860 and 862, fifth and sixth switches 870 and 872, and seventh and eighth switches 880 and 882. Indicia 840a and 842b are associated with the first and second switches 840 and 842, respectively. Indicia 860a and 862a are associated with the third and fourth switches 860 and 862, respectively. Indicia 870a and 872a are associated with the fifth and sixth switches 870 and 872, respectively. Indicia 880a and 882a are associated with seventh and eighth switches 880 and 882, respectively. The example first controller 822 may be tethered or mounted on the trailer 22 in a convenient location for access during operation of the hitch system 20. The optional second controller 826 may be provided and wirelessly connected to the first controller 822 to provide the functionality of the first controller 822 as described herein while walking around the trailer 22 and vehicle 24.

As apparent from FIG. 26 and the foregoing description, the example fixed controller 822 comprises 8 membrane style switches 840, 842, 860, 862, 870, 872, 880, and 882 that that, when pressed, generate electric button signals. These button signals are converted into transmitted signals that are transmitted from the first controller 822 to the hydraulic control system 824. Based on the transmitted signals, the hydraulic control system 824 controls the flow of hydraulic fluid to the actuators 830, 832, 834, 836, and 124 as will be generally described herein.

When the control system 820 is in a number entry mode of the system 820, the switches 840 and 842 function as "1" and "2" inputs. The example indicia 840a and 842a represent both wake/sleep functions of the buttons 840 and 842 as will be described below as well as also indicating that these buttons 840 and 842 serve the numeric "1" and "2" functions when the system 820 is in the number entry mode. The indicator light 850 is illuminated when the control system 820 is energized.

The indicia 860a and 862a associated with the third and fourth buttons 860 and 862 are upwardly facing arrows associated with extending the jacks. The associated switches 860 and 862 are thus depressed to operate the actuators 830-836 as necessary to obtain desired movement of the trailer 22. The indicia 860a and 862a also indicate that these switches 860 and 862 are associated with the numbers "2" and "3", respectively, when the system 820 is in the number entry mode.

The indicia 870a and 872a associated with the fifth and sixth buttons 870 and 872 are downwardly facing arrows associated with retracting the jacks. The associated switches 870 and 872 are thus depressed to operate the actuators 830-836 as necessary to obtain desired movement of the trailer 22. The indicia 870a and 872a also indicate that these switches 870 and 872 are associated with the numbers "4" and "5", respectively, when the system 820 is in the number entry mode.

The indicia 880a and 882a associated with the seventh and eighth buttons 880 and 882 are associated with opening and closing the hitch system 20 by operating the actuator assembly 124. The associated switches 880 and 882 are thus depressed to operate the actuator assembly 124 as necessary to attach the trailer 22 to and detach the trailer 22 from the ball member 40. The indicia 880a and 882a also indicate that the switch 880 is associated with the numbers "6" and "8" and the switch 882 is associated with the numbers "7" and "9" when the system 820 is in the number entry mode.

A front elevation view of the example second controller 826 is depicted in FIG. 27. As shown, the example second controller 826 comprises an indicator light 920, first and second switches 930 and 932, third and fourth switches 940 and 942, and fifth and sixth switches 950 and 952. Indicia 940a and 942a are associated with the third and fourth switches 940 and 942, respectively. Indicia 950a and 952a are associated with the fifth and sixth switches 950 and 952, respectively. The example first controller 822 is not tethered or mounted to the trailer 22 and may be carried around operation of the hitch system 20. The second controller 826 is optional and, as described above, may be wirelessly connected to the first controller 822 to provide at least some of the functionality of the first controller 822 as described herein while walking around the trailer 22 and vehicle 24.

The indicator light 920 indicates when the second controller 826 is wireless connected to the first controller 822 such that data can be transmitted between the fixed and second controllers 822 and 826.

The first and second switches 930 and 932 are shaped and/or colored to indicate the function: the first switch 930 is triangular and red and turns off the second controller, and the second switch 932 is round and green and turns on the second controller.

The indicia 940a and 942a are UP and DOWN arrows, respectively, and indicate that pressing the buttons 940 and 942 cause the trailer 22 to be moved up and down, respectively. The indicia 950a and 952a are also UP and DOWN arrows, respectively, and indicate that pressing the buttons 950 and 952 cause the coupler to be opened and closed, respectively.

With the foregoing understanding of the construction of the example control system 820, the control system 820 is used to operate the hitch system 20 and the actuators 830-836 as follows.

The example control system 20 is provided with a factory programmed Master Code. The Master Code cannot be reprogrammed without being sent back to the factory. The Master Code can be accessible online with a password protected account by performing the following steps:

1. Set up an account.
   Go to a predetermined secure website: (e.g., www.EZSwitchHitch.com)
   Go to "My Account".
   Create an account.
2. Enter Security Code
   Go to "My Account".
   Login to your new account.
   Click on "Add a Request".
   Under Department, enter "General".
   Make sure your information is correct.
   Under Subject, enter 'Security Code Retrieval'.
   Under Message, enter your 4-digit factory programmed Master Code.
   When you are finished, Click "Submit Request".
3. Retrieve Your Security Code.
   Go to the predetermined secure website.
   Go to "My Account".
   Login to your account.
   Under "My Last Requests", Click on the ID number of your request titled 'Master Code Retrieval" to access your 4-digit, factory programmed Master Code.

In the example control system 820, the Security Code must be used. The only way to retrieve the Master Code is by entering the information obtained by following these steps set forth above. If the Security Code is lost or otherwise unavailable, the unit must be shipped back to the factory for reprogramming.

The control system 820 will be shipped with a Master Code already programmed pre-selected by the user/purchaser. For installation purposes, the unit ships in a Service Mode. While in Service Mode, the control system 820 may be activated by entering the number sequence 0-0-0-0. The unit will turn on and operate exactly the same as with the special Master Code.

To take the system 820 out of Service Mode, the unit must be in a completely powered down state. The personal Master Code programmed in at the factory is entered, and the unit will exit Service Mode and will operate in a Master Mode and require entry of the Master Code.

A user in possession of the Master Code may place the unit back into Service Mode at any time to facilitate repair of the trailer. Alternatively, the trailer may be loaned to another party without giving that party the Master Code by placing the system 820 in Service Mode. More specifically, with the control system 820 in a completely powered down state, the Master Code is entered, and the "0" and the "7/9" buttons are held down simultaneously until the red light above the keypad starts to flash. The number sequence 0-0-0-0 is entered. The unit is now operating in Service Mode.

Once the Master Code has been entered, a timer will count down the time from the last input. If a predetermined "accelerated sleep" switch (e.g., second switch 842; second switch 932 (Red; OFF/"0")) is activated, a 3-minute window is commenced during which the system can be re-activated by pressing the a wake switch (e.g., first switch 840, first switch 930 (Green; ON/"1")) without the user having to re-enter the Master Code. If the accelerated sleep switch is not activated, the system 820 will stay activated for 10 minutes after the last input. After 10 minutes, the system 820 will turn off and can only be re-activated by entry of the Master Code.

To hook the trailer 22 to the vehicle 24, the truck and trailer should be on relatively level ground. The Master Code is entered to activate the first controller 822. The second switch 932 on the second controller 826 is pressed to activate the second controller 826. At this point, the vehicle 24 is arranged such that the ball 40 is under hitch post 26 and placed in park.

Figure 1A:
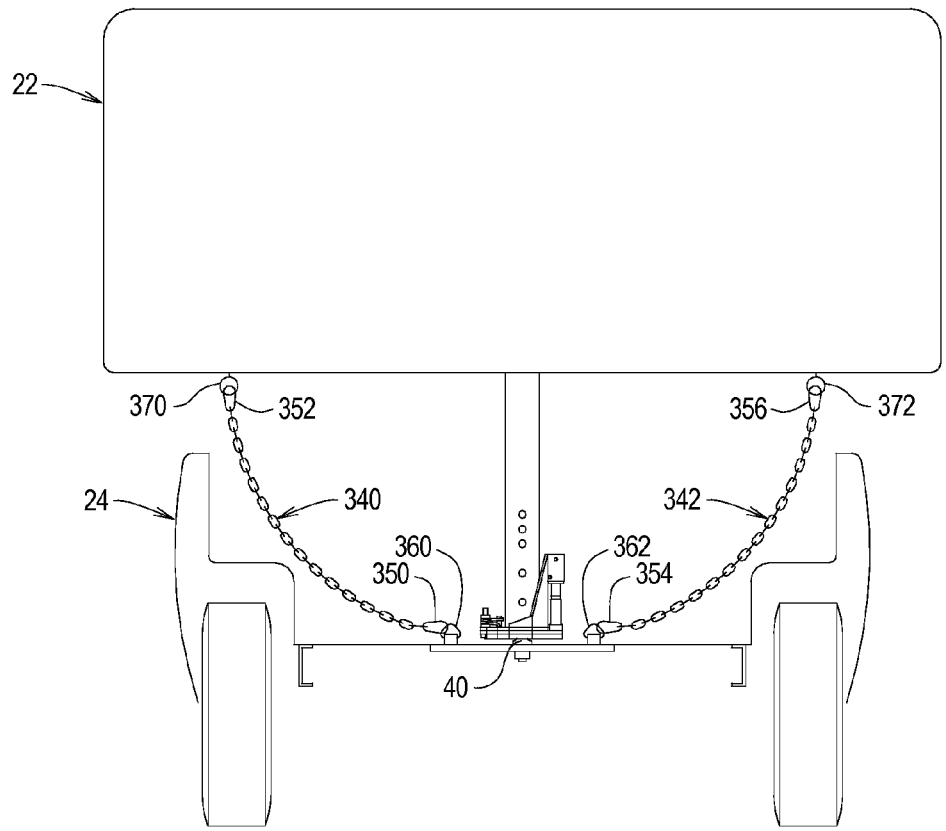
FIG. 1A is an elevation view of a chain system that may be used by the first example hitch system of the present invention.
Figure 2:
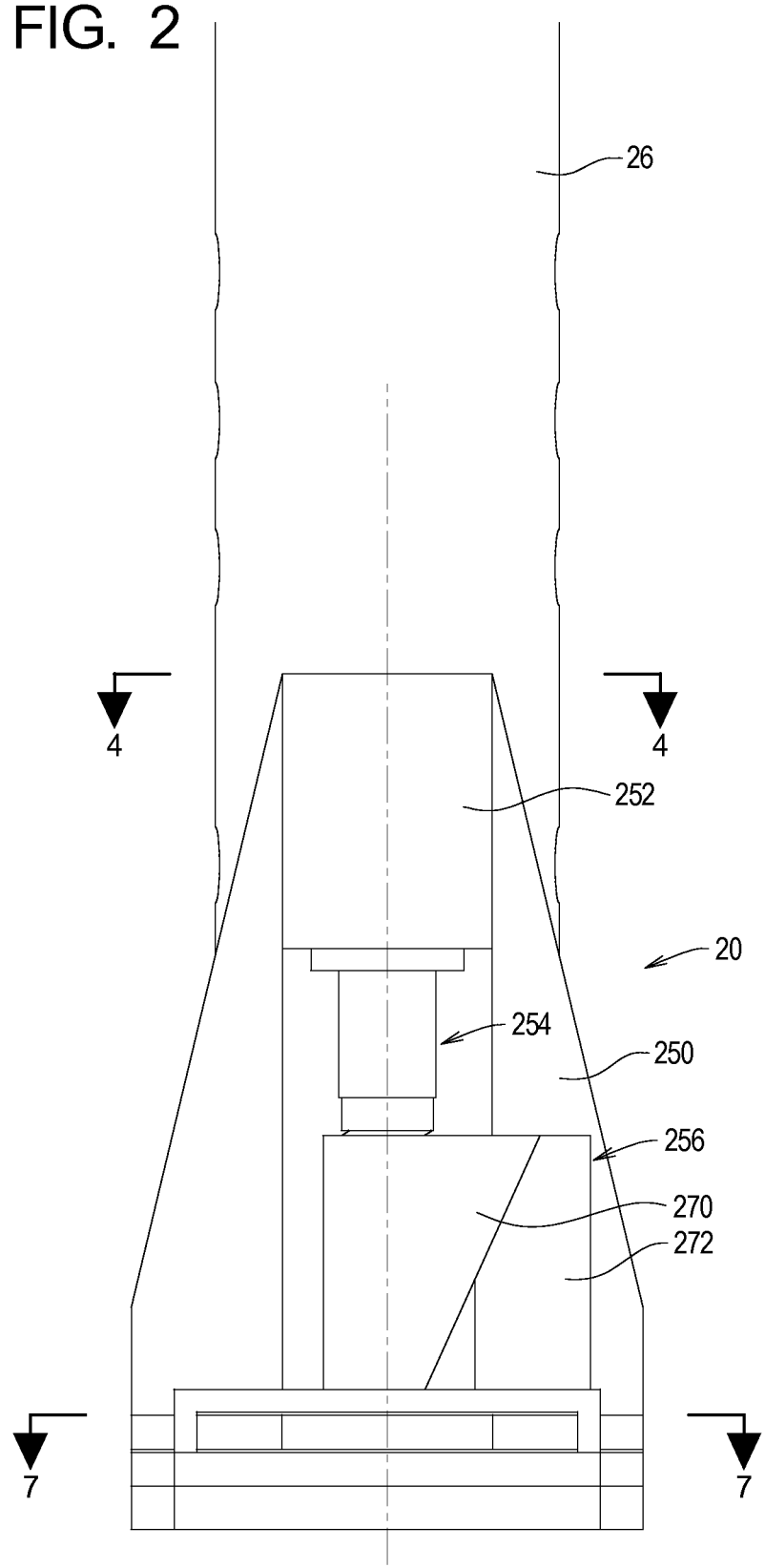
FIG. 2 is a left side elevation view of the first example hitch system.

The first controller 822 may be used, with either a single leg or a dual leg jack system, as follows. The "Trailer Down" button is pressed and held until the jack leg is fully retracted and truck bed ball is fully seated in the coupler's ball pocket. The "Close" button is pressed and held until the coupler is fully locked. Safety chains may be attached as described above with reference to FIG. 1A. A breakaway brake cable (not shown) may be attached to the vehicle 24, and the trailer 22 may be electrically connected to the vehicle 24.

With a single leg system, the second controller 826 is used as follows. The fourth button 862 (DS JACK) is pressed and held to lower the trailer down onto the truck and then further held until the jack leg is fully retracted and truck bed ball is fully seated in the coupler's ball pocket. The seventh button 880 (6/8) is then pressed and held to lock coupler onto truck bed ball and further held until the coupler is fully locked. Safety chains are attached to trailer's safety chain eyebolts, and a breakaway brake cable may be attached to the tow vehicle.

For a dual leg jack system, both the third and fourth switches 860 and 862 are pressed and held to lower the trailer down onto the truck and hold until jack legs are fully retracted and truck bed ball is fully seated in the coupler's ball pocket. The seventh button 880 is then pressed and held to lock the coupler onto truck bed ball and further held until coupler is fully locked. Safety chains are attached to trailer's safety chain eyebolts, and a breakaway brake cable is connected to the tow vehicle.

To unhook the trailer, the Master Code is entered to activate the first controller 822. The second switch 932 on the second controller 826 is then pressed to activate the second controller 826.

Once the Master Code has been entered to activate the first controller 822, a timer will count down the time from the last input. If the second switch 842 on the first controller 822 or the second controller 826 is pressed, a 3-minute window is started during which the system 820 can be re-activated by pressing the a predetermined switch on either the first controller or the second controller without the user having to re-enter the Master Code. If the appropriate predetermined switch is not pressed, the system 820 will stay activated for 10 minutes after the last input. After 10 minutes, the system 820 will turn off and will have to be re-activated with the Master Code.

With either the single or dual leg jack systems, the second controller 826 may be used to unhook the trailer as follows. After unhooking any safety chains, breakaway brake cable, and the trailer's electrical pigtail, the sixth button 952 is pressed and held until the coupler is fully unlocked. The "Trailer Up" switch 940 is then pressed and held until the jack leg is extended to provide sufficient clearance between the truck bed ball and the coupler. The truck may be pulled out from under trailer's gooseneck section.

Using the first controller 822 with a single leg jack system, the trailer may be unhooked as follows. Safety chains, any breakaway brake cable, and the trailer's electrical pigtail are disconnected. The eighth button 882 is pressed and held to unlock coupler from truck bed ball and held until the coupler is fully unlocked. One or both of the third and fourth switches 860 and 862 (jack up buttons) are pressed to raise the trailer up off of the truck and held until jack leg is extended enough to give plenty of clearance between the truck bed ball and the coupler. The truck is driven out from under trailer's gooseneck section.

Using the first controller 822 with a single leg jack system, the trailer may be unhooked as follows. Safety chains, any breakaway brake cable, and the trailer's electrical pigtail are disconnected. The OPEN button is pressed and held to unlock coupler from truck bed ball and held until coupler is fully unlocked. The passenger side trailer up button is pressed and held until the passenger side jack leg touches the ground. The driver side trailer up button is then pressed and held until the driver side jack leg touches the ground. The passenger and driver side buttons are then pressed together to raise the trailer up off of the truck and held until the jack legs are extended enough to give plenty of clearance between the truck bed ball and the coupler. The vehicle is then pulled out from under trailer's gooseneck section.

It can be seen that the example second controller 826 has only six buttons and provides only a subset of the functions provided by the example first controller 822. For example, the second controller 826 does not allow independent movement of the jacks if such independent movement is allowed by the hydraulic control system 824. Further, the second controller 826 does not allow entry of codes required to switch among the various security modes discussed above. With appropriate security precautions, the second controller 826 may be provided with additional functions up to, including, and beyond those provided by the first controller 822. Further, the functions of the second controller 826 may be implemented in software on a portable computing device such as an iPhone or iPad capable of wireless or wired communication with the first controller 822.

What is claimed is:

1. A hitch system for coupling a hitch post to a ball portion comprising:
   a lock plate adapted to be rigidly connected to the hitch post, where the lock plate defines a main opening and a first lock opening;
   a hitch plate assembly pivotably supported relative to the lock plate, where the hitch plate assembly defines a first ball opening and a second lock opening; and
   a lock assembly comprising
      a lock housing,
      a lock member supported by the lock housing for movement between first and second positions, and
      a detent member; wherein
   the hitch plate assembly may be pivoted between an uncoupled position and a coupled position relative to the lock plate;
   when the hitch plate assembly is in the uncoupled position, the main opening and the first ball opening are substantially aligned;
   when the hitch plate assembly is in the coupled position, the main opening and the first ball opening are partly misaligned and the first lock opening and the second lock opening are substantially aligned;
   when the hitch plate assembly is in the coupled position, the lock member is moved from a first position in which the lock member is not within the first and second lock openings to a second position in which the lock member is within the first and second lock openings to prevent the hitch plate from being pivoted out of the coupled position; and
   when the lock member is in the second position, the detent member engages the hitch plate assembly to inhibit movement of the lock member from the second position to the first position.

2. A hitch system as recited in claim 1, further comprising a detent release button that allows the detent member to be disengaged from the hitch plate assembly to allow movement of the lock member from the second position to the first position.

3. A hitch system as recited in claim 1, further comprising a lock bracket for supporting the lock housing such that the lock member is aligned with the first and second lock openings when the hitch plate assembly is in the coupled position.

4. A hitch system as recited in claim 1, in which the hitch plate assembly comprises:
   a hitch plate; and
   a guide plate secured to the hitch plate, where the guide plate defines a second ball opening that is aligned with the first ball opening.

5. A hitch system as recited in claim 4, in which the guide plate defines a guide surface that is angled towards the second ball opening.

6. A hitch system for coupling a hitch post to a ball portion comprising:
   a housing secured to the hitch post, where the housing defines a housing opening and a housing chamber;
   a hitch plate rotatably attached to the housing, where the hitch plate defines a first ball opening, and
      the hitch system operates in
         an unhitched configuration in which the first ball opening is aligned with the housing opening, and
         a hitched configuration in which the first ball opening is not aligned with the housing opening; and
   an actuator configured to selectively displace the hitch plate to place the hitch system in the unhitched configuration and the hitch configuration; and
   a control system operatively connected to the actuator, where the control system operates the actuator in a service mode and a master mode, where
      the control system operates in the master mode upon entry of a master code,
      entry of the master code is not required to operate the actuator using the control system when the control system is in the service mode, and
      entry of the master code is required to operate the actuator using the control system when the control system is in the master mode; wherein
   the ball portion is inserted into the housing chamber and removed from the housing chamber when the hitch system is in the unhitched configuration; and
   the ball portion is substantially secured within the housing chamber when the hitch system is in the hitched configuration.

7. A hitch system as recited in claim 6, in which:
   the control system ships in the service mode; and
   the master code may be obtained by entering a security code into a website.

8. A hitch system as recited in claim 6, in which entry of the master code is required to place the control system from the master mode into the service mode.

9. A method of coupling a hitch post to a ball portion comprising the steps of:
   providing a housing defining a housing opening and a housing chamber;
   securing the housing to the hitch post;
   providing a hitch plate defining a first ball opening;
   pivotably attaching the hitch plate to the housing such that the hitch plate allows the hitch system to operate in
      an unhitched configuration in which the first ball opening is aligned with the housing opening, and
      a hitched configuration in which the first ball opening is partly aligned with the housing opening; and
   arranging an actuator to selectively displace the hitch plate to place the hitch system in the unhitched configuration and the hitch configuration; and
   providing a control system operable in a service mode and a master mode, where
      the control system operates in the master mode upon entry of a master code,
      entry of the master code is not required to operate the control system when the control system is in the service mode, and
      entry of the master code is required to operate the control system when the control system is in the master mode;
   operatively connecting the control system to the actuator;
   operating the actuator using the control system; and
   inserting the ball portion into the housing chamber and removing the ball portion from the housing chamber when the hitch system is in the unhitched configuration, where the ball portion is substantially secured within the housing chamber when the hitch system is in the hitched configuration.

10. A method as recited in claim 9, further comprising the steps of:
    shipping the control system in the service mode; and
    obtaining the master code by entering a security code into a website.

11. A method as recited in claim 9, further comprising the step of requiring entry of the master code to place the control system from the master mode into the service mode.

* * * * *